United States Patent [19]
Slotznick

[11] Patent Number: 6,108,640
[45] Date of Patent: *Aug. 22, 2000

[54] SYSTEM FOR CALCULATING OCCASION DATES AND CONVERTING BETWEEN DIFFERENT CALENDAR SYSTEMS, AND INTELLIGENT AGENT FOR USING SAME

[76] Inventor: Benjamin Slotznick, 507 Third St., Mt. Gretna, Pa. 17064

[*] Notice: This patent is subject to a terminal disclaimer.

[21] Appl. No.: 09/006,681

[22] Filed: Jan. 13, 1998

Related U.S. Application Data

[63] Continuation-in-part of application No. 08/944,923, Oct. 6, 1997, Pat. No. 5,983,200
[60] Provisional application No. 60/035,189, Jan. 14, 1997.
[51] Int. Cl.$^7$ ................................................. G06F 17/60
[52] U.S. Cl. ................................ 705/26; 705/1; 705/27; 705/28; 705/39; 705/40; 706/11; 706/59; 704/9; 364/705.08
[58] Field of Search ............................. 705/26, 27, 10, 705/6, 8, 1, 28, 39, 40; 706/11, 59; 704/9; 345/326; 364/479.01, 705.08; 368/108, 24; 377/52

[56] References Cited

U.S. PATENT DOCUMENTS

| | | | |
|---|---|---|---|
| 4,005,571 | 2/1977 | Wolff | 368/108 |
| 4,055,749 | 10/1977 | Kraushaar | 377/52 |
| 4,418,274 | 11/1983 | Masillo | 235/85 R |
| 4,528,643 | 7/1985 | Freeny, Jr. | 380/4 |
| 4,813,707 | 3/1989 | Habib | 283/2 |
| 4,852,030 | 7/1989 | Munday | 702/178 |
| 5,026,095 | 6/1991 | Hoyeck | 702/178 |
| 5,036,472 | 7/1991 | Buckley et al. | 264/479.03 |
| 5,168,445 | 12/1992 | Kawashima et al. | 705/10 |
| 5,222,052 | 6/1993 | Salame | 368/28 |
| 5,241,464 | 8/1993 | Greulich et al. | 705/26 |
| 5,309,355 | 5/1994 | Lockwood | 705/6 |
| 5,316,342 | 5/1994 | Almo | 283/2 |
| 5,319,542 | 6/1994 | King, Jr. et al. | 705/27 |
| 5,369,570 | 11/1994 | Parad | 705/8 |
| 5,390,281 | 2/1995 | Luciw et al. | 706/11 |

(List continued on next page.)

OTHER PUBLICATIONS

International Search Report for PCT/US98/00628, 2 pages.
Rubenking, N., "Windows Wake–up Call", *PC Magazine*, Nov. 19, 1996, p. 60.
Bernstein, P., "A Personal Information Manager for Lawyers", *Legal Bytes*, May 1994, pp. 35–36.
Commence®: The Workgroup and Personal Information Manager, Commence Corporation (printout from Website www.commence.com/pdatasht.html), 1996, 5 pages.
Author unknown, SoftwareLabs [Internet], [retrieved on Mar. 9, 19999], retrieved from www.softwarelabs.com, 1–13, Nov. 1995.
Bonnie Shenkin, Ted W. Gross, Israel Business Today, v6, n256, dialog article 05575973 from file 148, pp. 1 and 2, Dec. 1991.
International Search Report for PCT/US97/18307, 2 pages.

*Primary Examiner*—Stephen R. Tkacs
*Assistant Examiner*—Raquel Alvarez
*Attorney, Agent, or Firm*—Akin, Gump, Strauss, Hauer & Feld, L.L.P.

[57] ABSTRACT

An occasion database and a date converter are provided in a device which allows a user to retrieve restored occasion information, whether the occasion occurs in the Gregorian calendar or a non-Gregorian calendar. A formula is stored for each occasion to allow its date to be calculated for any given year. The date converter converts between Gregorian and non-Gregorian dates. Conversions from one non-Gregorian calendar to another non-Gregorian calendar may also be performed. An intelligent agent executes date sensitive tasks by using at least one calendar and date calculation module for providing date information necessary to execute the date sensitive tasks. The tasks may be executed at a future time and on a periodic basis. Periodic tasks may be associated with occasions that occur in the Gregorian or non-Gregorian calendar.

29 Claims, 19 Drawing Sheets

OCCASION TABLE

400

| OCCASION/HOLIDAY | CALENDAR SYSTEM | FORMULA | OCCASION INFORMATION |
|---|---|---|---|
| Christmas | Gregorian | December 25 every year | Attend church, exchange presents, family gathering. |
| Easter | Gregorian | Formula 1 | |
| Federal Election Day | Gregorian | Formula 2 (1st Tuesday after the 1st Monday in November in every even numbered year) | Go to voting polls. |
| Mardi Gras | Gregorian | Formula 3 (47 days before Easter) | Party. |
| Mother's Day | Gregorian | Formula 4 (2nd Sunday in May) | |
| Passover | Jewish | Formula 5 | Also called "Pesach". Attend Seder on at least first evening, no leavened bread is eaten. |
| Ramadan | Muhammadan (Islamic) | Formula 6 | Fast from sunrise to sunset during the entire month. |
| Rosh Hashanah | Jewish | Formula 7 | Attend services, hear shofar (if not a Sabbath day), casting off Greeting: "L'shanah tovah" ("For a good year"). |

U.S. PATENT DOCUMENTS

| | | | |
|---|---|---|---|
| 5,434,777 | 7/1995 | Luciw | 704/9 |
| 5,452,341 | 9/1995 | Sattar | 379/88.27 |
| 5,473,732 | 12/1995 | Chang | 706/59 |
| 5,477,447 | 12/1995 | Luciw et al. | 704/9 |
| 5,513,117 | 4/1996 | Small | 364/479.03 |
| 5,524,201 | 6/1996 | Shwartz et al. | 345/326 |
| 5,550,746 | 8/1996 | Jacobs | 364/479.01 |
| 5,555,496 | 9/1996 | Tackbary et al. | 705/27 |
| 5,559,714 | 9/1996 | Banks et al. | 364/479.03 |
| 5,586,025 | 12/1996 | Tsuji et al. | 707/500 |
| 5,719,826 | 2/1998 | Lips | 368/29 |
| 5,742,563 | 4/1998 | Kataoka et al. | 368/24 |
| 5,764,597 | 6/1998 | Shih | 368/29 |

NEW OCCASION FORM

CALENDAR SYSTEM

DATE

OCCASION INFORMATION

FORMULA | Word and number choices | Other
         | Free Form              |

OCCASION CHARACTERIZATION

DATE CONVERTER - TABLE

| GREGORIAN CALENDAR DATE | DAY OF WEEK (Gregorian) | JEWISH (Hebrew) CALENDAR DATE | MUHAMMADAN (ISLAMIC or HIJRI) CALENDAR DATE | CHINESE CALENDAR DATE |
|---|---|---|---|---|
| JANUARY 1, 1998 | THURSDAY | 3 TEVETH 5758 | 2 Ramadan 1418 A. H. | Cycle 78<br>Year 14 (Ding-Chou)<br>Month 12 (Ji-Si)<br>Day 3 (Wu-Shen) |
| JANUARY 2, 1998 | FRIDAY | 4 TEVETH 5758 | 3 Ramadan 1418 A. H. | Cycle 78<br>Year 14 (Ding-Chou)<br>Month 12 (Ji-Si)<br>Day 4 (Ji-You) |
| ... | ... | ... | ... | ... |
| DECEMBER 31, 2050 | SATURDAY | 16 TEVETH 5811 | 16 Rabi II 1473 A. H. | Cycle 79<br>Year 7 (Geng-Wu)<br>Month 11 (Gui-Si)<br>Day 18 (Yi-You) |

Fig. 7

DATE CONVERTER - FORMULAIC
(Gregorian to non-Gregorian)

| JEWISH (HEBREW) CALENDAR DATE | MUHAMMADAN (ISLAMIC or HIJRI) CALENDAR DATE | CHINESE CALENDAR DATE |
|---|---|---|
| FORMULA GJ | FORMULA GH | FORMULA GC |

DATA CONVERTER - FORMULAIC
(Gregorian to non-Gregorian)

| | JEWISH CALENDAR DATE | MUHAMMADAN CALENDAR DATE | CHINESE CALENDAR DATE |
|---|---|---|---|
| REFERENCE DATE EQUIV. TO JANUARY 1, 1600 | 14 TEVETH 5360 | 14 JUMADA II 1008 | Cycle 71 Year 36, month 11, day 16 |
| | FORMULA J | FORMULA M | FORMULA C |

OCCASION TABLE

| OCCASION/HOLIDAY | CALENDAR SYSTEM | FORMULA | OCCASION INFORMATION |
|---|---|---|---|
| Christmas | Gregorian | December 25 every year | Attend church, exchange presents, family gathering. |
| Easter | Gregorian | Formula 1 | |
| Federal Election Day | Gregorian | Formula 2 (1st Tuesday after the 1st Monday in November in every even numbered year) | Go to voting polls. |
| Mardi Gras | Gregorian | Formula 3 (47 days before Easter) | Party. |
| Mother's Day | Gregorian | Formula 4 (2nd Sunday in May) | |
| Passover | Jewish | Formula 5 | Also called "Pesach". Attend Seder on at least first evening, no leavened bread is eaten. |
| Ramadan | Muhammadan (Islamic) | Formula 6 | Fast from sunrise to sunset during the entire month. |
| Rosh Hashanah | Jewish | Formula 7 | Attend services, hear shofar (if not a Sabbath day), casting off Greeting: "L'shanah tovah" ("For a good year"). |

SYSTEM FOR CALCULATING OCCASION DATES AND CONVERTING BETWEEN DIFFERENT CALENDAR SYSTEMS, AND INTELLIGENT AGENT FOR USING SAME

CROSS-REFERENCE TO RELATED APPLICATIONS

This application is a continuation-in-part is U.S. application Ser. No. 08/944,923, filed Oct. 6, 1997 now U.S. Pat. No. 5,983,200 entitled "INTELLIGENT AGENT FOR EXECUTING DELEGATED TASKS", which is incorporated by reference in its entirety herein.

This application claims the benefit of U.S. Provisional Application Ser. No. 60/035,189, filed Jan. 14, 1997, entitled "APPARATUS FOR CALCULATING HOLIDAY DATES AND CONVERTING BETWEEN CALENDAR SYSTEMS".

BACKGROUND OF THE INVENTION

The present invention relates to apparatus and methods for determining the date of periodic occasions, such as holidays, and date converters for converting dates back and forth between Gregorian calendars and non-Gregorian calendars.

Calendars are based to a large extent upon the major natural cycles; the rotation of the earth (the 24 hour day), the revolution of the moon around the earth (the lunar month) and the revolution of the earth around the sun (the solar year). The importance of these cycles is that many events in nature are determined by them, and that these events of nature have had implications for both primitive and advanced economies. For example, the growing seasons (spring, summer, fall, winter) are determined by the position of the earth with respect to the sun, whereas the tides are determined primarily with respect to the position of the earth with respect to the moon (and to a lesser extent the position of the earth with respect to the sun). A major aim of all calendars has been to accurately describe these natural cycles and hence make these natural events and their economic consequences more predictable. A major task of all calendars has been to reconcile the different periodicities of these cycles.

For example, a solar year is approximately 365 days, but is not exactly 365 days. The aim of many calendars has been to ensure that the seasons (as represented by a calendar's date for the solstices and equinoxes) remain the "same" every year. To make the calendar more accurate, the Julian calendar (also referred to as the "old civil calendar" and which is the official calendar adopted by Julius Caesar and the Roman Empire) added an extra day in every year divisible by four (i.e., a "leap year", every four years). For even greater accuracy, the Gregorian calendar (also referred to as the "modern civil calendar" and used as the official calendar of most Western nations, including the United States) eliminated leap year in those "century" years which are not divisible by 4 (e.g., there was no leap year in the year 1900 AD because 19 is not divisible by 4).

Consider the example of the lunar month which is approximately 30 days. In fact, it is between 29 and 30 days. But a "year" of 12 lunar months is only a fraction of a day more than 354 days. The Gregorian calendar retains its accuracy with respect to the sun by allowing its 12 months to exceed 30 days and to depart from the lunar cycle. On the other hand, the Islamic calendar is based solely on the lunar month with a "year" consisting of 12 lunar months, and regularly scheduled "leap years" with an extra day. For the Islamic calendar the start of every year will have the same relationship to the lunar cycle, but not the same relationship to the (solar) seasons of the year.

The Hebrew calendar also contains 12 lunar months, but it adds an extra 29 day month seven times every 19 years so that the calendar stays approximately in line with the seasons. The Chinese calendar is also based upon a lunar month and has another (different yet similar) method of reconciling the lunar and solar cycles. Other calendars have different, but well defined, methodologies for achieving these ends.

In addition, many calendar systems divide the passage of time into 7 day weeks, with one particular day having special religious significance as a day of rest (e.g., Friday for Moslems, Saturday for Jews, Sunday for Christians). In some religions, certain religious holidays must occur on particular days of the week.

Not only do different religions have different holidays, but different religions may base their holidays on different calendars. Some religions use different periodicities for different holidays. For example, those Christian holidays termed "immovable feasts" (e.g., Christmas) have been based on a solar cycle such as the Gregorian calendar. Other Christian holidays termed "movable feasts" (e.g., Easter, Lent) are based upon multiple cycles (Easter being essentially the first Sunday after the first new moon after the spring equinox with some other adjustments).

In any event, these natural cycles and subsequent calendars, as well as related religious holiday schedules, are mathematically well defined, although not easily accessible to the lay-person. In addition, to one knowledgeable in the art, the calculations that must be performed to find the date in one calendar system for another event or holiday defined in another calendar system or by other such cycles are straightforward, although sometimes tedious.

Printed calendars and date books are common and frequently show holidays, but are limited not only by the space on the printed page, but also by the calendar system employed. For example, a Gregorian-based calendar or Book-of-Days can easily show that Christmas occurs on December 25 of each Gregorian year, but it can only show Easter (and other Christian moveable feasts or holidays based upon other calendar systems) for one particular year. Each year must be listed separately for these holidays, thereby eliminating much of the calendar's convenience. The issue is not resolved by standard perpetual calendars.

A calendar document can reference more than one calendar system. For example, "The Comprehensive Hebrew Calendar", published by Feldheim Publishers, Nanuet, N.Y., copyright 1986, contains side-by-side renderings of both the Gregorian calendar and the Hebrew calendar (with Jewish holidays noted) for the years 1900 to 2100. However, this "double" calendar requires more than 400 pages to accomplish its task.

Furthermore, there are software programs which address particular holidays. Several software programs give Gregorian dates for Jewish holidays. Some programs address Christian moveable feasts. Greeting card and calendar software include some limited holiday calendaring features.

Various websites on the Internet examine holiday issues. For example, the Indonesian National Holidays posted on http://hastu.com/holidays.html include Gregorian calendar dates for several years for Indonesian Independence Day (based on the solar calendar), 6 Moslem holidays (based on the Hijriyah lunar calendar system), 3 Christian holidays (based on the Metonic cycle and Gregorian calendar), one Hindu holiday (based on the Saka/Caka calendar system)

and one Buddhist holiday (based on the Indonesian Buddhist calendar system). Many of these holiday related sites are listed at the CalendarLand website (at http://www juneau.com/home/janice/calendarland/cultural-religious).

Information searching on the Internet is time-consuming. The accuracy of information obtained on the Internet cannot be verified and conflicting information cannot be resolved. The software products and Internet information may have depth, but remains parochial, listing many holidays for many years but only for one religion or ethnicity. Other efforts provide less depth but more breadth, listing several religions but fewer holidays for each one, or for only several years. None of the offerings appear to provide easy and quick access to an encyclopedic approach to the desired information.

Furthermore, the software products and Internet information are generally read-only devices for retrieving information. There is no facility to add information on an as-needed basis for a particular individual's needs.

Many holiday greetings and courtesies to friends or business associates are put off or forgotten because there is no easy or certain way of determining the date of the holiday and the appropriate greeting. In many instances, searching out the information has lower priority than other tasks at hand. In other instances, a person simply doesn't know or think to ask about holidays of other cultures or religions. Individuals may commit serious holiday faux pas through ignorance (for example, inviting a client who is a Moslem to lunch on a Moslem fast day). As commerce becomes more international and more multicultural, easy access to basic ethnic holiday customs becomes essential to building rapport between business contacts.

Accordingly, there is an unmet need for apparatus and methods which allow a user to quickly and easily obtain occasion information associated with Gregorian and non-Gregorian calendars, and to convert dates between such calendars. Furthermore, there is a need to obtain occasion information and to perform calendar conversions when using an intelligent agent to execute tasks. The present invention fulfills such needs.

BRIEF SUMMARY OF THE INVENTION

The present invention provides apparatus and methods for determining the date of periodic occasions. The apparatus and method use an occasion database for storing a plurality of occasions and a formula for each occasion for determining the date of each occasion for a given year, and a processor for determining the date of occasions by using the formula. The occasion database may include occasions and respective formulas associated with Gregorian and non-Gregorian calendars. The apparatus and method may also use a date converter for storing data which allows for date conversions between Gregorian and non-Gregorian calendars. The date converter may be used to obtain the occasion date in a desired calendar type from a specified occasion. New occasions may be learned which are entered into the occasion database along with their formulas.

The present invention also provides apparatus and methods for converting Gregorian dates to corresponding dates in at least two non-Gregorian calendar types. A date converter stores data which allows for date conversions between a Gregorian calendar and at least two non-Gregorian calendars. A user interface connected to the date converter includes an input device and an output device. The input device is used for entering a Gregorian date and at least two target non-Gregorian calendar types. The output device communicates to a user the corresponding dates in the targeted non-Gregorian calendar types.

The present invention also provides apparatus and methods for converting a non-Gregorian date to a corresponding date in at least one other non-Gregorian calendar type. A date converter stores data which allows for date conversions between at least two different non-Gregorian calendars. A user interface connected to the date converter has an input device and an output device. The input device is used for entering a non-Gregorian date and at least one different target non-Gregorian calendar type. The output device communicates to a user the corresponding date in the at least one targeted non-Gregorian calendar type.

The present invention also provides an intelligent agent for executing tasks, wherein at least some of the tasks are date sensitive. The intelligent agent comprises at least one data input device for entering tasks to be executed, at least one calendar and date calculation module for providing date information necessary to execute the date sensitive tasks, a computer, and at least one output device. The computer is connected to the at least one data input device and to the at least one calendar and date calculation module. The computer receives the entered tasks and calendar and date information relevant to the tasks, processes the information, and generates instructions for executing the tasks. The at least one output device is connected to the computer and executes the tasks. The instructions for executing the date sensitive tasks may include instructions to execute at least one of the date sensitive tasks on a periodic basis. If so, at least some of the date sensitive tasks may be based upon a date of a non-Gregorian calendar, and the calendar and date calculation module may be programmed to determine Gregorian calendar dates for executing the task based upon the non-Gregorian calendar or based at least in part on a non-Gregorian periodicity or periodicities. A method for performing the intelligent agent functions is also provided.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 6 is a sample user interface for inputting new occasions into the apparatus of FIG. 1;

FIG. 7 is a sample date converter in a table format for use in the apparatus of FIG. 1;

FIG. 8 is a sample date converter in a first formulaic format for use in the apparatus of FIG. 1;

FIG. 9 is a sample date converter in a second formulaic format for use in the apparatus of FIG. 1;

FIG. 10 is an occasion table for use in the apparatus of FIG. 1;

DETAILED DESCRIPTION OF THE INVENTION

Figure 1:
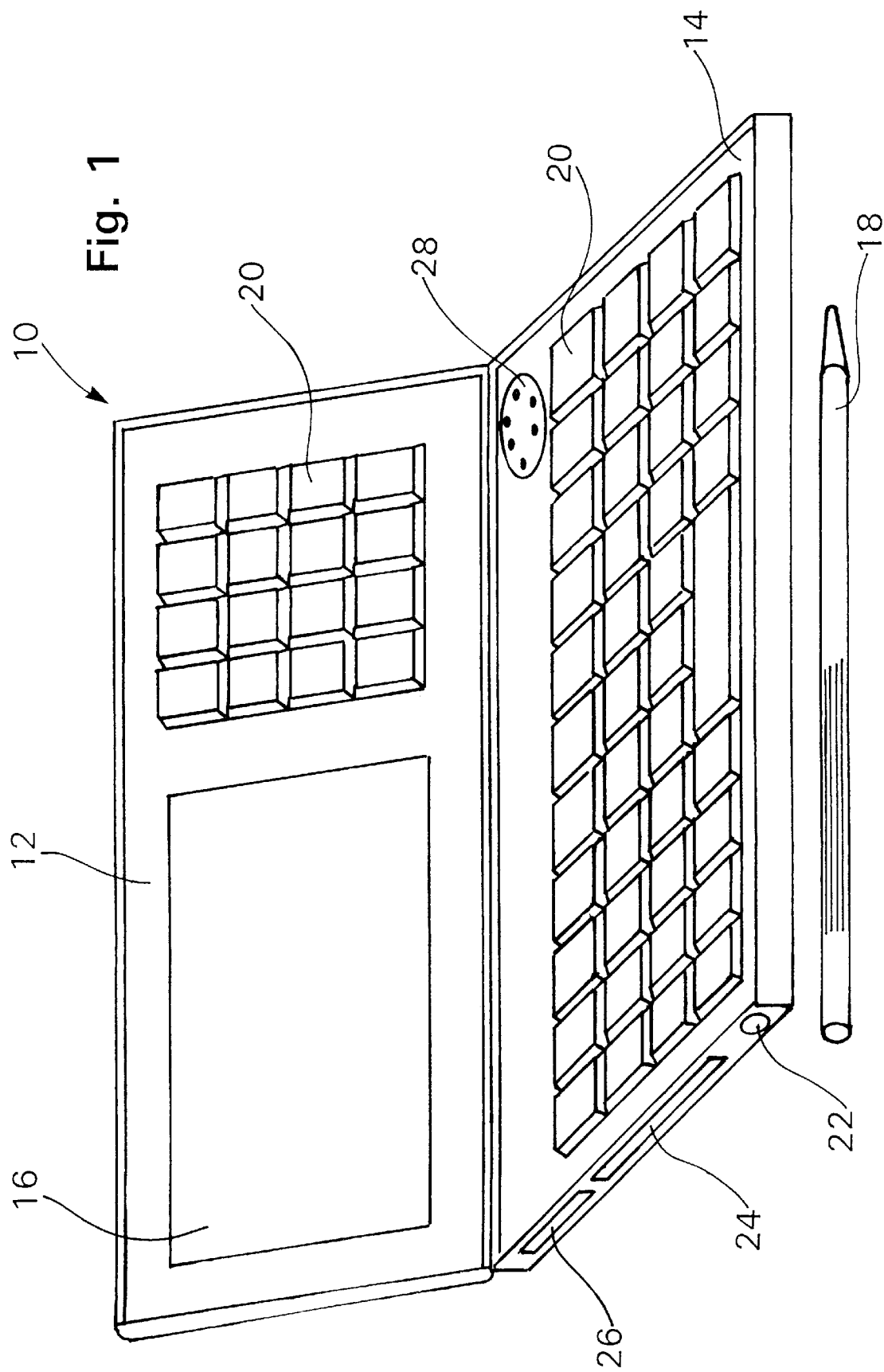
FIG. 1 is a perspective view of a stand-alone hand-held electronic apparatus for displaying occasion dates and occasion information in accordance with a first embodiment of the present invention.

Certain terminology is used herein for convenience only and is not to be taken as a limitation on the present invention. In the drawings, the same reference numerals are employed for designating the same elements throughout the several figures.

Definitions

The below described apparatus in accordance with the present invention is a stand-alone or interconnected device with electronic components calculating and displaying holiday or other periodic based calendar information, at times through "natural language" commands and at times aided by intelligent agents and/or expert systems. The apparatus may itself act as an expert system or intelligent agent for other devices not described herein.

The following definitions are provided to promote understanding of the invention:

The term "occasion" means a periodically occurring special event, celebration, religious holiday (fixed or moveable), national holiday, festival, or the like.

The term "periodic", means that an occasion which occurs repeatedly at regular intervals of time (such as the first day of every month, or every Tuesday, or at a specified date once a year, or a combination of such cycles), regardless of the time cycle or calendar used or compounded type cycles or calendars used. Periodic information includes occasion dates (regardless of calendar system) and times of periodic events, such as sunrise, sunset, tides, or first sighting of lunar events, which are based not only on the date, but on the location (e.g., latitude and longitude) and national time systems (e.g., daylight savings time), and occasions calculable from such periodic occurrences (e.g., an hour before sunrise).

The term "stand-alone device" refers to devices including (but not limited to) hand-held electronic devices, desktop electronic devices (such as electronic clocks or rolodexes), vending machines, and kiosks which display dates or calendars or refer to holidays. Input devices include alphanumeric keypads, numeric keypads, pointing devices (including but not limited to track balls, mouse pointers, and touch pads), touch screens, handwriting input pressure pads or light pens, various digitizer pads, scanners (including those for graphics, text and handwriting), optical character recognition modules, handwriting recognition modules and voice recognition modules.

The term "stand-alone" device also refers to devices which automatically transmit to or receive data from third parties regardless of the manner of transmission. The essence of this type of stand-alone device is that the calculation of holiday information is performed by the device without need of data transmission. For example, an electronic rolodex with automatic phone dialer that also electronically displays the current time and date along with the day's holidays would be a stand-alone device because the data transmission is not related to the holiday calculations.

The term "interconnected device" refers to devices which perform the same functions as the aforementioned stand-alone device, but distribute the physical and electronic components among two or more locations and connect those components so that electronically encoded data can pass between and among them. The connection may be via wire, conduit or other substance through which electrical signals can pass, via fiber-optic cables or other material through which light waves or other electromagnetic radiation can pass, or via air or vacuum through which radio or other electromagnetic waves can pass. The connection may include any combination of the above media. An example of an interconnected device is a device similar to the standalone device but with an essential component located nearby. The essential component might be a credit card verifier, a printer, a second keyboard for debugging, or the like. Similarly, several otherwise stand-alone devices located in one business, store, home or shopping mall might share a single printer, a single modem for transmitting and dispensing electronic items, or a single central processing unit. The term "interconnected device" includes systems in which the central processing unit is not located in one place but rather is distributed, where input is distributed, and where memory and data storage may be separate from the computational components (which themselves may be centrally located or located at various central places or distributed). In other words, parts of the computations may be performed at different locations and parts of data may be stored at different locations. Computation and memory systems may include but need not require redundancies. The term "interconnected device" includes both hardwired components, and networked systems of components. The term includes but is not limited to systems of mainframes connected to dumb or smart terminals, personal computers or workstations, systems of client/servers connected to personal computers and workstations, and mixtures of such systems. The term "interconnected device" includes distributing the components over a network of networks such as the Internet. The term includes on-line computer access, interactive television access, and telephone access, where the input is through components (including but not limited to personal computers, interactive televisions, telephones, pagers, electronic organizers, electronic rolodexes, personal digital assistants, ATM money machines, fax machines, scanners, and handwriting input devices) owned by various parties and possibly used for purposes other than those described herein. This term applies regardless of which part of the creation, recollection, or dispensing of the product is distributed. As such, the term interconnected device includes software and/or hardware which enables a personal computer, interactive television or telephone or other home or office machine or appliance to become part of an interconnected device for the purposes contained herein or which enable such machines to simulate the workings of a stand-alone device or an interconnected device for the purposes contained herein. The term also includes software regardless of how it is distributed, whether it is hardwired into the machine, hard coded into its operating system, written to hard disk or permanent memory, or into temporary storage (including but not limited to CD-ROM and floppy disk), or temporarily residing in the machine via a Java-type applet downloaded from a server or off a network such as the Internet.

The term "interconnected device" includes software and/or hardware which enables a user, a sensing device, computer (or other) hardware, or software to perform occasion calculations as if it were an interconnected device or an object which simulates the workings and/or actions of an interconnected device, even though owned by various parties and possibly used for purposes other than those described herein. For example, to the extent that off-the-shelf software such as (but not limited to) relational databases or spreadsheets trigger an interconnected device or perform holiday calculations on an interconnected device, or embed or link an apparatus with another program, or call a function, module, procedure, subroutine, or the like which acts as an interconnected device, or itself triggers or performs holiday calculations on or embeds or links an apparatus with an interconnected device, the off-the-shelf software during such triggering, delegating, embedding or calling is part of an interconnected device, even though for other purposes the off-the-shelf software might not be covered by the invention described herein. An "interconnected device" includes a device which connects to more than one interconnected devices. The term "interconnected device" includes the situation in which two or more interconnected devices link or communicate with one another, including ascertaining tasks, breaking the tasks into smaller parts, and distributing the partial tasks between or among the interconnected devices in forms of inter-device task delegation and also including situations in which the several interconnected devices must provide each other with information on a one time, repeated or on-going basis in order to accomplish the occasion calculations or its partial components.

The terms "stand-alone" device and "interconnected" device also refer to devices which perform occasion calculations or incorporate modules that perform occasion functions even though the devices may also (or even primarily) perform a variety of functions or tasks that are not the subject of the present invention.

The term "natural language command" means a command or request which is understood by the device and could occur in spoken conversation between two people, such as one person and a subordinate to whom a task is being delegated. The recognized commands depend upon the task at hand and a particular device might recognize only one "sentence" or syntax of command appropriate to the tasks it has been designed to accomplish. The term includes not only commands given in English, but in any other language, whether spoken, mouthed, written, signed (including sign-language for the deaf), or visualized. Both stand-alone devices and interconnected devices may, but need not, use natural language commands.

The term "intelligent agent" means a device or program which enables a device to simulate the knowledge base or problem solving abilities of a human executive assistant or agent. The term includes databases (whether or not incrementally gathered) which "learn" relationships, substitutes, names, personal euphemisms, and the like. The term "intelligent agent" refers to a device or software which accomplishes one or more of the above or similar operations.

The term "expert system" means a device or program which enables a device to simulate the knowledge base or problem solving abilities of a human expert in a particular field or fields. The term includes programs which either mimic or attempt to simulate the decision tree and choice rules which an expert uses to diagnose a problem (such as a doctor diagnosing an illness or an auto mechanic analyzing the source of a mechanical problem in a car engine), propose solutions to the problem (such as a doctor writing prescriptions for a patient's illness that do not create bad reactions with the patient's other prescriptions), find relevant information from extended or extensive databases, or otherwise apply rule based systems of logic and inference to problem solving (or problem defining) activities. The term includes both systems designed for well defined problems, as well as those designed for amorphous situations. The term includes both systems relying on "hard and fast" rules as well as those incorporating "fuzzy" logic or probabilistic decision analysis. In addition the term includes both systems incorporating deductive reasoning from known premises, and inductive reasoning from observations (such as, but not limited to, the use of Bayesian estimators). The term includes all such rule based systems regardless of the mathematical methodology or logical structure used to develop or implement the rules. The term "expert system" applies both to a program or device actively called upon by the user for advice, as well as a program which offers unsolicited advice (such as error messages). In addition, the term applies both to a program which gives "advice" as well as one which works in the background to help choose, categorize or rank options.

The term "output device" refers to a device for communicating information to a user. The output device may be a physical device, such as a printer, or the output device may be an electronic or virtual device, such as a modem or display screen which communicates electronically or visually.

Overview of Present Invention

To help in understanding the purpose of the present invention, some of the information retrieval functions and tasks that may be performed are as follows:

(1) Enter an occasion and obtain the date of the next occurrence of the occasion in the associated calendar type (e.g., Gregorian, Jewish, Hindu) or in a different calendar type.

EXAMPLE QUERY: When is the next Easter?

(2) Enter an occasion and obtain the date of the occurrence of the occasion for a specified year.

EXAMPLE: When is Easter in 2010?

(3) Enter a time frame (e.g., a single date, a specified week, or a specified month) and a calendar type and obtain a list of all occasions which occur in the entered time frame for the calendar type and/or for other calendar types.

EXAMPLE 1: What occasions occur on Dec. 1, 1998 in the Gregorian calendar?

EXAMPLE 2: What occasions occur in the month of February 1998 in the Gregorian calendar and the Jewish calendar?

(4) Enter a Gregorian calendar date and obtain the date in a specified non-Gregorian calendar, and vice-versa; or Enter a specified non-Gregorian calendar date and obtain the date in another specified non-Gregorian calendar.

EXAMPLE 1: What is the Jewish calendar date for Dec. 1, 1998?

EXAMPLE 2: What is the Gregorian calendar date for the Jewish calendar date of the 17th of Kislev 5758?

EXAMPLE 3: What is the Chinese calendar date for the Jewish calendar date of the 17th of Kislev 5758?

(5) Enter an occasion (or select one from a list) and obtain information related to the occasion, such as greetings, customs or etiquette.

EXAMPLE: What are the customs associated with Ramadan?

The apparatus of the present invention is also capable of learning information for subsequent retrieval. This allows the apparatus to be customized for a particular user, thereby enhancing its value to the user. Some learning tasks are as follows:

(1) Enter the occasion date of someone known to the user.
EXAMPLE: Enter the birthday or wedding anniversary of the user's children or spouse.

(2) Enter an occasion which has a non-trivial formula for determining when it occurs.
EXAMPLE: Enter "U.S. Federal Election Day", along with its formula, first Tuesday after the first Monday in November in every even numbered year.

As noted above, the occasions need not be directly calculable from the standard Gregorian calendar, but may require reference to other ethnic calendars (such as Chinese, Jewish, Islamic or Hindu), Christian moveable feasts (such as Easter), and natural cycles (e.g., lunar or tidal).

The apparatus of the present invention may be embodied as a stand-alone handheld electronic Book-of-Days, similar in appearance and design to various hand-held electronic currency converters, foreign language translators, organizers, dictionaries and thesauruses. It may also have plug in cards or cartridges or other add-on memory devices to augment its database of occasions. The apparatus may also be embodied as a stand-alone kiosk or as an electronic datebook connected to one or more remote devices, as a network of connected devices such as (but not limited to) personal digital assistants, pagers, messaging devices, computers, workstations, telephones, printers and/or fax machines with or without paper print-outs. The apparatus may be embodied in other ways as well. The connections between devices may be via one or more of (but not limited to) the following: telephone wires, cable TV wires, wireless communications (including infrared devices, cellular, mobile phone and satellite communications) and other electronic networks including but not limited to the Internet.

Since the apparatus of the present invention accomplishes its tasks through written, visual, pointing devices, graphics and/or verbal commands, the apparatus is accessible for the disabled, for those whom English is a second language, and for those with no knowledge of English.

Detailed Description

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 1, the numeral 10 generally refers to a device for displaying occasion dates and occasion information and converting dates between calendar systems. The device includes a base or body 14 and a video display 12 which includes a screen 16. The screen 16 may include a transparent interactive overly to act as a touch screen, by which the user may use his or her finger or a stylus as a pointing device. A stylus 18 is also shown which may be used to select items from the screen 16. When not in use, the stylus 18 may be kept in a slot 22 in the apparatus. An alphanumeric keyboard (or keyboards) 20 is (are) affixed to the body 14 of the apparatus for data entry of alphanumeric and other information. The video display 12 is hinged to the body 14. The video display 12 and body 14 swing together, so that the video display 12 can act as a lid for the device 10. A slot 24 on the side of the apparatus allows the user to attach additional cards or cartridges (such as PCMCIA cards, which are not shown) to the apparatus which add functionalities, memory, programs, modems, and the like to the device 10. A communications port 26 (for example, an infrared communications port) enables the apparatus 10 to exchange data wirelessly with other devices so equipped. A microphone 28 receives audio input.

Figure 2:
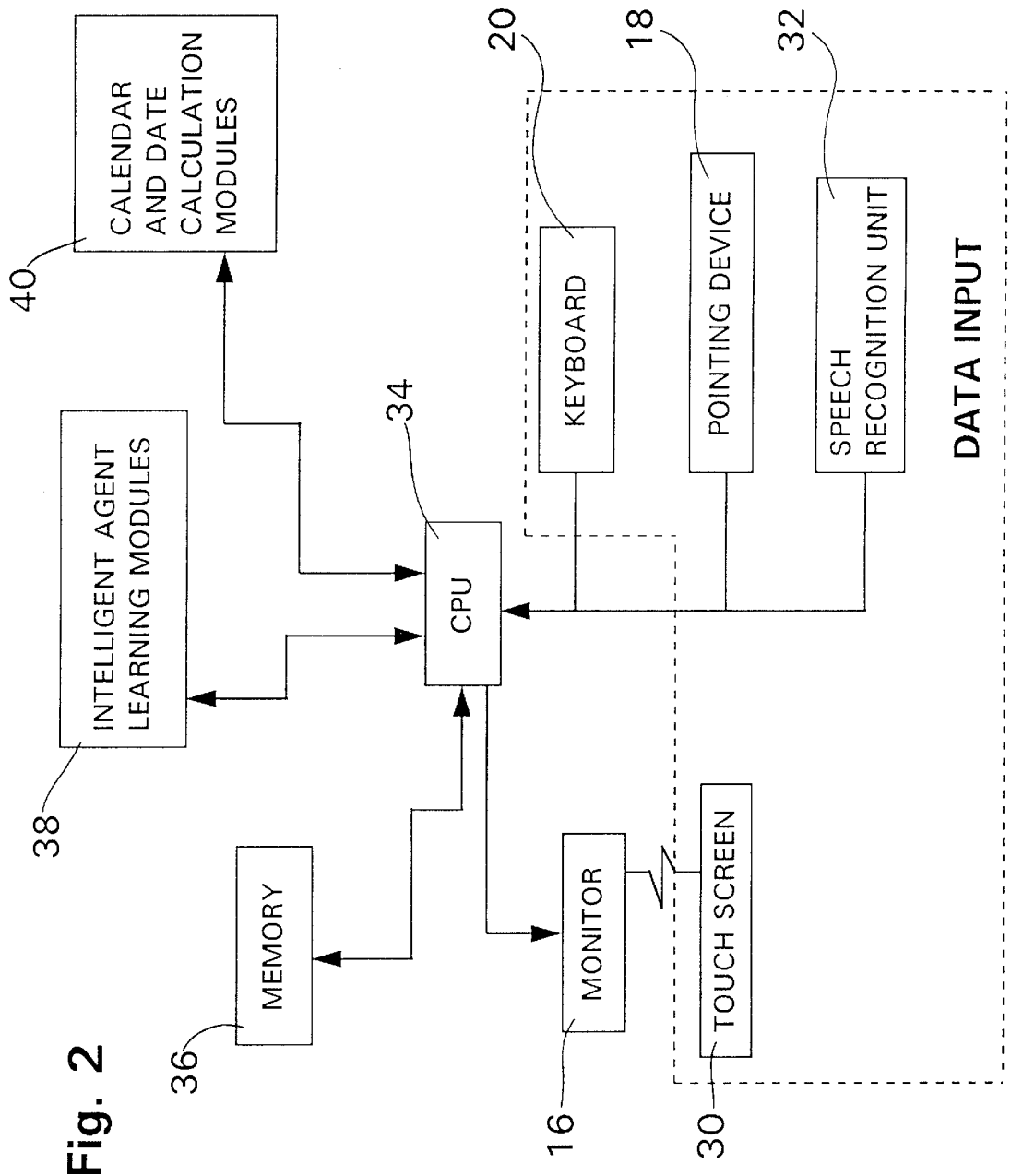
FIG. 2 is a schematic block diagram of the electronic apparatus of FIG. 1.

Referring to FIG. 2, a schematic block diagram of the apparatus 10 is illustrated. A programmable processor and CPU 34 is in communications with various kinds of memory 36 as well as one or more intelligent agent learning modules 38 and calendar and date calculation modules 40, either of which may be hard coded into the CPU 34 or onto one or more separate connected microchips, such as digital signal processors. The CPU 34 is connected to various data input devices, such as the keyboard 20, a pointing device such as the stylus 18 (or a mouse, track ball or other digitizer), a speech recognition unit 32, or a touch screen 30. In addition, the CPU 34 is connected to a monitor such as an interactive screen 16.

Figure 3:
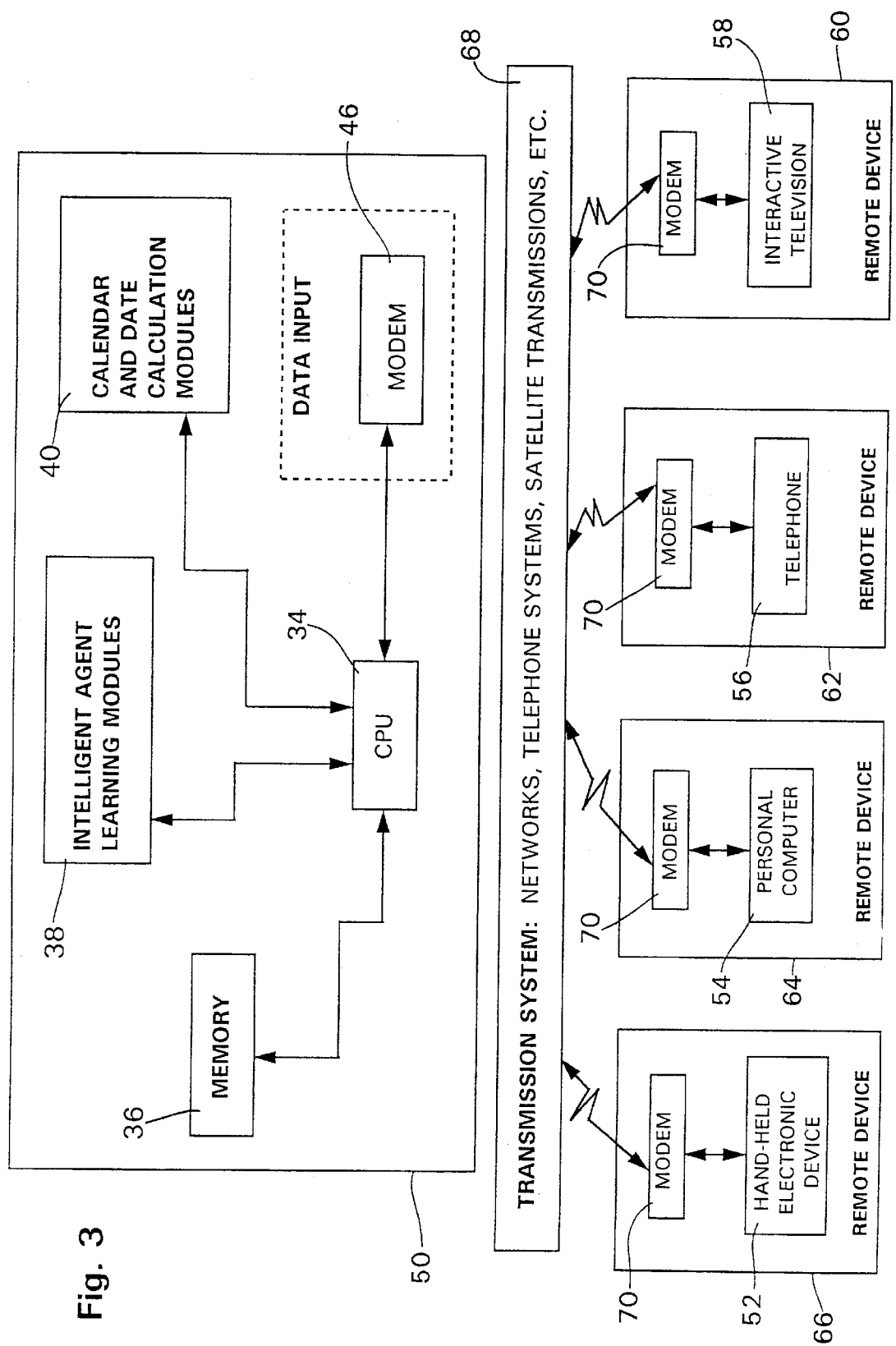
FIG. 3 is a schematic block diagram of an interconnected device for displaying occasion dates, in accordance with another embodiment of the present invention.

FIG. 3 is a schematic block diagram of an alternative embodiment of the invention in which an interconnected device which includes the apparatus FIG. 1 as one of the remote devices (e.g., 60, 62, 64, or 66) connected to central hub 50 of the system. The central hub 50 may act as either a mainframe with "dumb" input devices, or as a server with "smart" input devices in a client server architecture. The central hub 50 contains a processor or CPU 34 and various kinds of memory 36 and includes one or more intelligent agent learning modules 38 and calendar and date calculation modules 40, either of which may be hard coded into the CPU 34 or onto one or more separate connected microchips.

Input to the central hub 50 is provided via the various remote devices (60, 62, 64 or 66). Each remote device, whether a hand-held electronic device 52, personal computer 54, telephone 56, interactive television 58, or other device (not shown) includes or is attached to a modem 70 which digitizes and encodes the input data for transmission to the central hub 50. The input data is transmitted to the central hub 50 through a transmission system 68 which may include one or more networks (such as the Internet) telephone systems (public and/or private), radio wave, microwave, and/or satellite transmission systems, infrared signals and the like. At the central hub 50, a modem 46 reconstitutes the data into an electronic form usable by the CPU 34. The central hub 50 may have one or more modems to perform the input and output operations.

The remote devices (60, 62, 64 and 66) may each have their own processors or CPUs, memory facilities, intelligent agent learning modules and/or calendar and date calculation modules (not shown in FIG. 3).

The illustration is most easily understood in terms of an interactive device to which a user has frequent access, such as a desktop personal computer or dumb terminal connected to a network so that users will be repeat customers. The intelligent agent learning modules are useful only for repeat users. In a situation where repeat users are unlikely (perhaps a high volume shopping mall), the learning portion of the apparatus might be omitted.

Each repeat user is assigned a password or user identification number. The password or user identification number might be assigned by a system operator or administrator prior to a user's first use of the device. In an integrated computer system, a user might have the same password to access both the portions of the computer system which embody this invention, and other portions of the computer system which perform other tasks, such as word processing, or accounting. Alternatively, the device might assign a password to the user on his or her first use of the device or may let the user pick his or her own password that the device then remembers. If the user's access to the interactive device is via software installed on his or her own computer, the password might be assigned or chosen as a part of the setup and installation procedure of the software. Alternatively, the device might be programmed to accept as a valid ID a user ID issued by a third party (e.g., a credit card number, PIN number or social security number, or the like). Rather than a password, the device might use other user identification procedures, such as retina scans, finger print scans, vocal identification, or the like, with requisite hardware incorporated into the device. If the user's access to the interactive device is via software installed on his or her own desktop terminal or computer, "logging on" to the computer or computer system using that user identification number and password, may also automatically "log" the user on to the present invention. In such a case, the enabling software resides as a memory resident program (like many scheduler and organizer programs) which is loaded when the machine is first booted up, but remains "dormant", with minimal use of machine resources until the user calls upon the present invention ("logs on") such as by clicking an icon, pressing a special key or combination of keys, or issuing a special voice or other command.

If repeat users are unlikely (as in a high volume shopping mall) and the learning portion of the device is omitted, or the apparatus is a hand-held electronic device like a personal digital assistant or electronic organizer, "logging on" consists of pushing a Start button, or inserting currency, or a credit card. Alternatively, the payment operation (including entering the user's PIN number) might occur after the item to be sent had been selected and confirmed.

Figure 5:
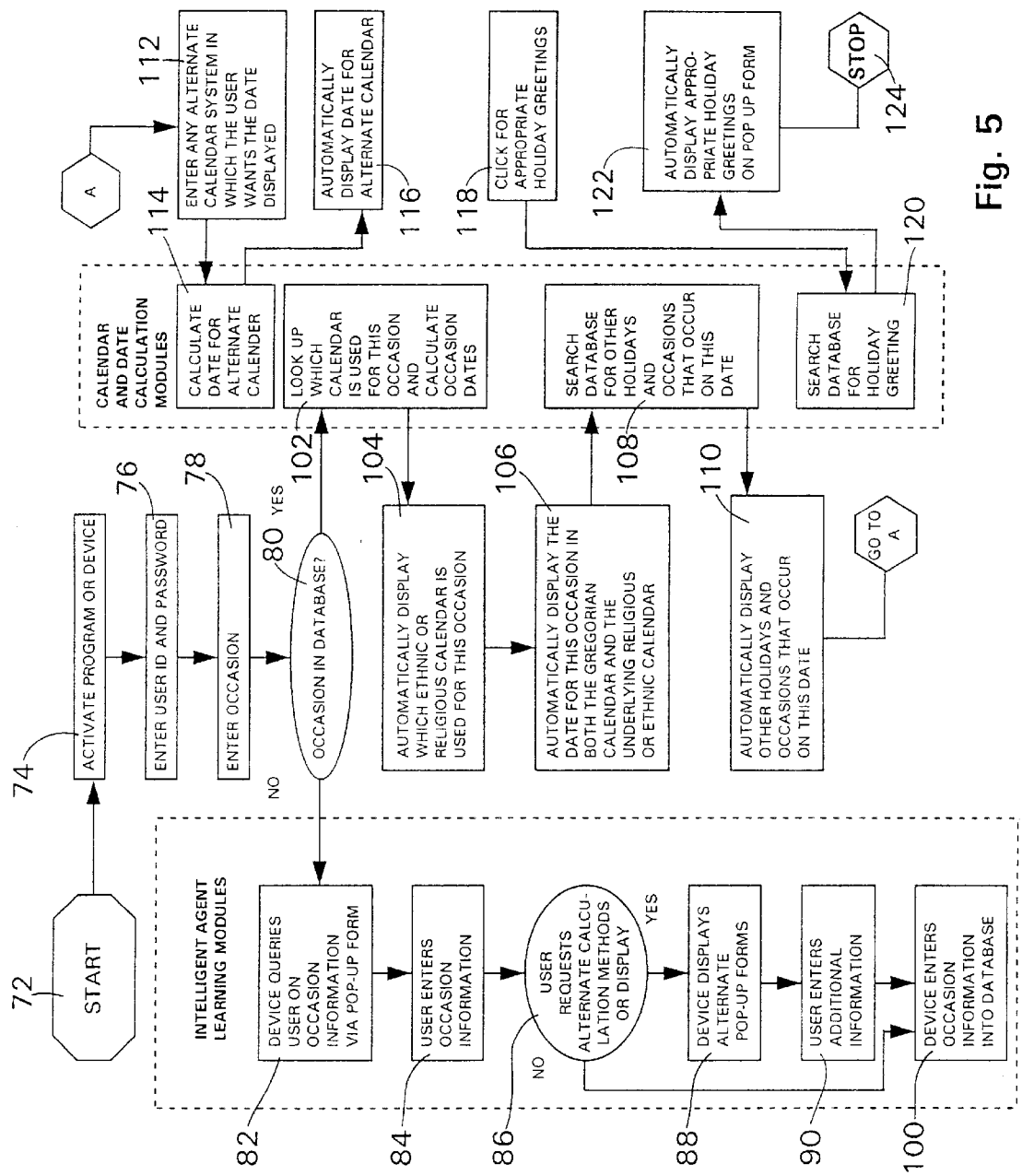
FIG. 5 is a flow diagram of a method used to calculate and display the occasion database and create a database of learned occasions from a remote device of FIG. 3.

In any event, referring now to FIG. 5, the user first "logs on" to the device (step 72), activating the program or device (step 74). The user then enters his or her password and/or user identification number (step 76). (In alternative embodiments, the device initiates and completes some other procedure to identify the user).

Figure 4:
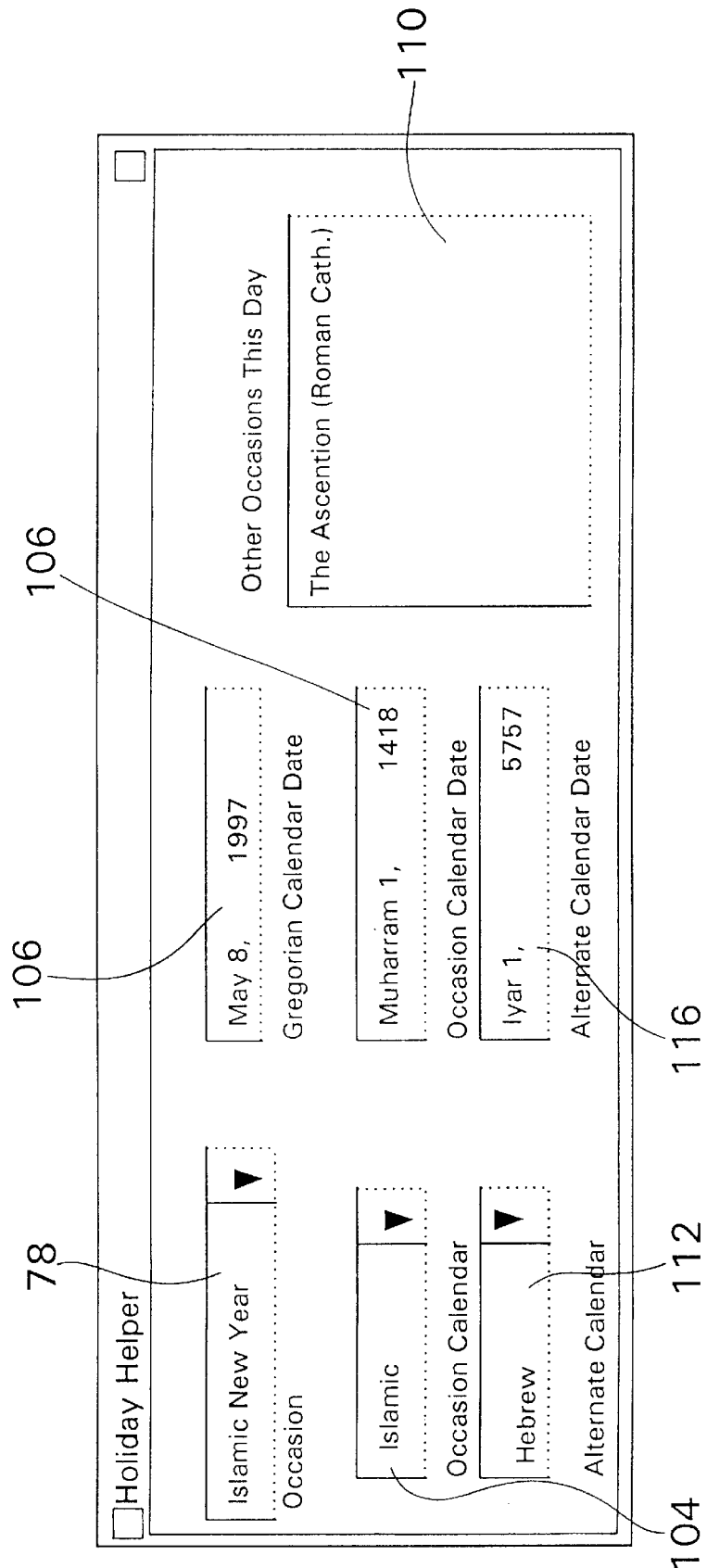
FIG. 4 is an illustration of a representative menu for a hand-held personal digital assistant, a personal computer or an interactive television for calculating and displaying occasion dates and occasion information in accordance with a remote device of FIG. 3.

FIG. 4 shows the first screen that might appear to the user on the device's video screen 16 or monitor (after user identification (step 76)). Not shown are keys which allow the user to choose which natural language will be employed on screen (e.g., English as shown, Spanish, Japanese). With certain embodiments of the invention, choice of language is omitted or made at first installation, at initial set up, or at first use. Not shown are portions of the learning modules by which the device learns which language the user wishes to use. Choice of language affects a variety of settings such as the appropriate holiday greeting. To the extent that different languages represent different cultures, default choices of message content and the like are affected.

The user then enters the occasion (step 78). Examples of an occasion are a national holiday such as Thanksgiving, a religious holiday such as Easter, a cultural holiday such as Kwanzaa, a company holiday such as the first day of deer-hunting season, or a special personal occasion. The occasion can be typed in, or chosen by point and click from a drop-down combo list. If the occasion is already on the list, when the user types the first few letters of the occasion, the device's program automatically completes the occasion.

If the occasion is in the device's database (step 80), the device identifies the calendar that the occasion is based upon, the date of the occasion and (if the occasion is not based upon the Gregorian calendar) the corresponding Gregorian date (step 102). The device then displays this data (steps 104 and 106).

If the occasion is not in the device's database (step 80), the device will ask if the entered occasion is a new occasion via a pop up form (step 82). A sample pop up form 200 is shown in FIG. 6. The pop up form 200 requires (and prompts via help file or voice synthesized response) the user to properly enter and/or confirm a variety of occasion information (step 82), including spelling of occasion, occasion date, calendar system and occasion characterization (e.g., religious holiday, personal holiday, national holiday, employment holiday). The pop up form 200 requires data entry via pointing device 18 (point and click), alphanumeric keyboard 20 (type and tab) or microphone 28 (e.g., utilizing voice recognition). The pop up form 200 may also be "read" to the user via a synthesized speech module or device using loudspeakers (not shown).

On the pop up form 200 (step 82), the user must enter the date of the occasion as well as the calendaring system (step 84) on which the occasion is based (e.g., Gregorian calendar, Hebrew calendar, or the like). For data entry (step 84), the user may enter the date (e.g., using numbers like "10/27/96" or using words such as "Oct. 27, 1996"), or may use words such as "Now", "Today", "Tomorrow", "Next Week", or may point and click on the image of a calendar. In addition, the user may click on words highlighted in the on-screen instructions in step 84 (on the form or through a help file not shown in this example, see, for example, the text displayed on FIG. 17). If the user types "other" in step 84 on the form 200 or otherwise requests alternative data entry forms (step 86), additional pop up screen(s) (step 88) allows other choices and methods to be used for occasion formula calculation, such as (a) selecting a particular numbered weekday in a given month (e.g., Thanksgiving, the fourth Thursday in November in the Gregorian calendar), (b) selecting a number of days after such a numbered weekday (e.g., United States federal Election Day, the first Tuesday after a first Monday in November every even numbered year in the Gregorian calendar), or (c) selecting the Monday after a given date (e.g., many holidays that fall on a weekend are celebrated the following Monday), or the like. A free form mode may also be selected for entering complex formulas, such as those used to calculate Easter or Rosh Hashanah. After the user enters primary information (step 84) and any additional information (step 90), the device stores the information in its database (step 100).

By gathering data on occasions only when a new occasion is mentioned, the device learns new information incrementally, on an as needed basis, and stores it in its occasion database (step 100).

In this preferred embodiment of the invention, the database consists of several tables, including a date table and an occasion table, both of which reside in the calendar and date calculation modules 40.

A sample date table 300 is shown in FIG. 7. The date table 300 functions as a date converter, to convert Gregorian dates to non-Gregorian dates, and vice-versa, and to convert one non-Gregorian date to another non-Gregorian date. The date table 300 contains an entry (e.g., a "row" in a database table) for every day in a pre-specified time frame (e.g., 300 years). Each date entry contains the date (month, day, year) as expressed in each of the referenced calendar systems or relevant periodicities. The date table 300 may include other information, such as day of the week, sunrise/sunset time and calculation information.

An alternative embodiment of the FIG. 7 table-type date converter is a formula-type date converter, shown in FIGS. 8 and 9. These types of date converters are preprogrammed with date converting formulas which generate the same data provided in the table-type date converter. For example, referring to FIG. 8, date converter 302 stores formula GJ for converting a Gregorian date directly to a date in the Jewish calendar, formula GH for converting a Gregorian date directly to a date in the Muhammadan calendar, and formula GC for converting a Gregorian date directly to a date in the Chinese calendar. Referring to FIG. 9, date converter 304 stores formulas J, H and C which calculates the current date from a fixed reference date, such as Jan. 1, 1600. Of course, the reference date may be any fixed date, including a date in the future. This reference date entry contains date (month, day, year) as expressed in each of the referenced calendar systems or relevant periodicities. The date calculation modules are augmented by various date functions for each calendar system (based upon their set cycles) similar to the date functions for the Gregorian calendar that are built into current languages and operating systems. In this alternative embodiment, when the device is activated (step 74), the device calculates the number of days between the current date on the system clock and Jan. 1, 1600. Date addition functions (for each calendar system) calculate the current date for each calendar system (by adding the number of days from the current Gregorian date in the systems clock to 1/1/1600 onto the date of 1/1/1600 expressed in the alternate calendar system). The appropriate year for the next occurrence (this year or next year) of an occasion specified in step 78 is then readily determined via date subtractions functions (for the appropriate calendar system), which is then displayed (step 106). Reversing the process (subtracting back to 1/1/1600 using a date subtraction function in the alternate calendar system for number of lapsed days and then using a Gregorian date addition function) yields the occasion date in the Gregorian Calendar which is also displayed (step 106). Similarly, the device calculates this date in terms of the other referenced calendar system (step 114), which may be displayed (step 116) or used internally to search the occasion table for co-occurring holidays and occasions (step 108), for display (step 110).

Other embodiments use appropriate combinations and variations of these tables and functions to yield accurate occasion dating. These and other embodiments may display the alternate dates in a calendar type image, with overlays, colors, typeface, positioning, and the like to display several calendar systems at one time. Occasions and holidays may be similarly blocked off on a calendar grid with colors or typefaces keyed to the underlying referenced calendar.

The formula-type data converters 302 and 304 take up less memory space than the table-type data converter 300 but require additional processing time and resources to obtain a conversion compared to the data converter 300 which executes table look-up only.

FIG. 10 shows an occasion table 400 which contains an entry for each occasion stored in the device. Referring to FIG. 10, each occasion entry contains the name of the occasion (e.g., Christmas, Ramadan), the calendar system used for calculating the occurrence of the occasion (e.g., Gregorian calendar, Islamic calendar), and the "formula" date of the occasion. Formulas relate to the specified calendar system and include by way of example (but not limited to) the month and day (e.g., December 25 for Christmas), the month and weekday (e.g., second Sunday in May for U.S. Mother's Day), set time from another occasion (e.g., 47 days before Easter Sunday for Mardi Gras), or more intricate calculations (e.g., first Tuesday after the first Monday in November every even numbered year for U.S. federal Election Day). The occasion table 400 may contain other occasion information such as a list of alternative spellings of the occasion, appropriate greetings for the occasion, or etiquette and customs concerning the occasion. Alternatively some of this additional information may appear in a separate help file or help table.

The database structure allows new occasions to be added to the occasion table 400 for each calendar system represented in the date table 300. (In this regard, many life occasions, such as birth and death are memorialized by religious observances on the anniversary date as calculated via the religion's calendar system). These new occasions are added by intelligent agent learning modules in steps 82, 84, 86, 88, 90 and 100, as described above.

The occasion table is directly searchable for the calendar system associated with any particular holiday or occasion (step 102) as well as the month and day in which the occasion occurs (step 102). The result may be displayed by the device at step 104. If an occasion requires calculation to determine the date for a particular year (e.g., U.S. Father's Day, the third Sunday in June), the device applies the formula from the occasion table 400 to the information supplied in the date table 300 and/or the system clock functions (e.g., deriving the next occurrence from today's date, month, day, year, and weekday in the system clock). In this manner, the device calculates the appropriate date when different years are entered. In any event, after calculation, the date is displayed (step 106) along with the corresponding date in the Gregorian calendar obtained from the date table 300.

More succinctly, the device displays the chosen calendar system (step 104) and the date (steps 104 and/or 100) in that system. If that calendar system is not the Gregorian calendar, this particular embodiment automatically displays the corresponding Gregorian date (step 106).

After displaying the date (step 106), the device converts that date to the other calendar systems (i.e., alternative month, day, and year in the Jewish, Islamic, Chinese calendars, and the like) in the date table 300 and searches the occasion table 400 for any occasions occurring on those alternative date formulations (step 108). Occasions that require additional calculation (e.g., second Sunday in May) will be computed where appropriate (the date is in May) and checked (step 108). These other occasions are then displayed (step 110), but not the alternative date formations, unless requested (step 112).

The date table 300 allows the device upon request (step 112) to directly convert from the date in one calendar system to the date in another calendar system (step 114), and to display the result (step 116).

The occasion table 400 allows the device upon request (step 118) to directly search the occasion table 400 or associated help files to retrieve appropriate occasion or holiday greetings (step 120) and related information for display (step 122). If the user wishes to know the appropriate greeting for the occasion or holiday, the user clicks a help button (step 118) (not shown in FIG. 4). The machine looks up the appropriate greeting in its occasion table 400 (step 120) and displays it (step 122). Some embodiments would offer other forms of occasion information, such as appropriate gifts, traditional holiday foods, and other customs (e.g., such as fasting rituals), in the occasion help file.

The device can pull information from other databases that maintain an open format such as Microsoft's Schedule+(a contact management and scheduling program). The device also automatically posts information to such databases, so that the information which the device obtains is accessible for other uses and programs. Alternatively, the device can incorporate its own contact management and scheduling programs with other appropriate forms for data entry and display.

In some embodiments, clicking OK (or a close button designated by an "X" in a square) closes the program (step 124). In other embodiments, the program enters a "dormant" phase like a memory resident desktop organizer, appointment scheduler or screen saver, waiting to "awake" when more occasion information is desired. In other embodiments, such as a stand-alone kiosk, clicking OK returns the program to an opening screen, inviting prospective users to log on (step 72).

If the user does not have a particular occasion in mind, and just enters a date, either in the Gregorian calendar date or by choosing an occasion calendar and occasion calendar date, the "Occasion" field is left blank, but all occasions occurring on the entered date are shown. (The phase "Other Occasions This Day" is electronically altered to read "Occasions This Day"). Again the user can find this date in another calendar system by choosing that calendar system as the alternate calendar. In this way, the device converts dates between calendar systems.

The formulas used in the above-described tables are well-known and may be obtained from any number of reference sources. Accordingly, details regarding the formulas are not described in further detail herein.

FIG. 10 shows a sample occasion table 400 which includes occasions/holidays that occur in both Gregorian and non-Gregorian calendars. However, the scope of the invention covers an occasion table 400 which has occasions/holidays that occur only in a Gregorian calendar, only in a non-Gregorian calendar, or only in another type of periodic calendar, such as a tidal calendar. In such an alternative embodiment, the date converter 300 would not be required if the user inputs occasions/holidays in his or her native calendar type and desires an output date in the same calendar type.

Figure 11:
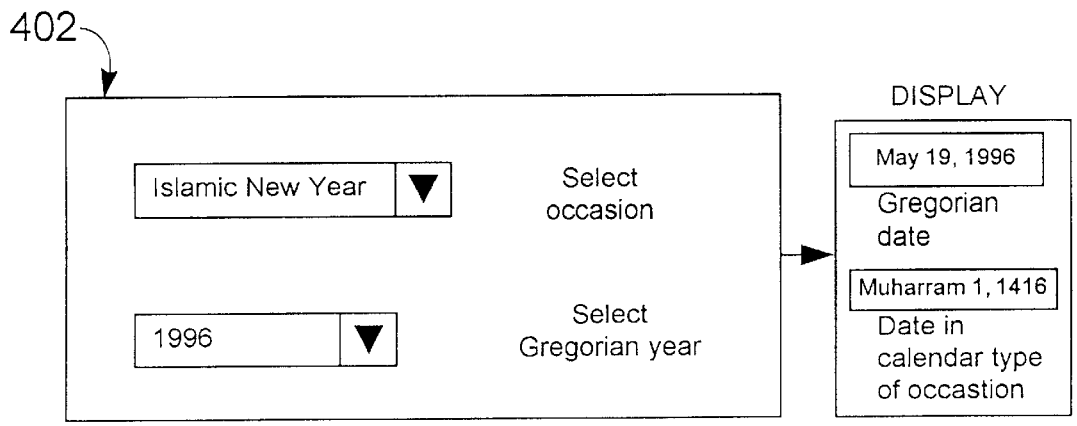
FIGS. 11–13 are additional sample user interfaces for use in the apparatus of FIG. 1.
Figure 12:
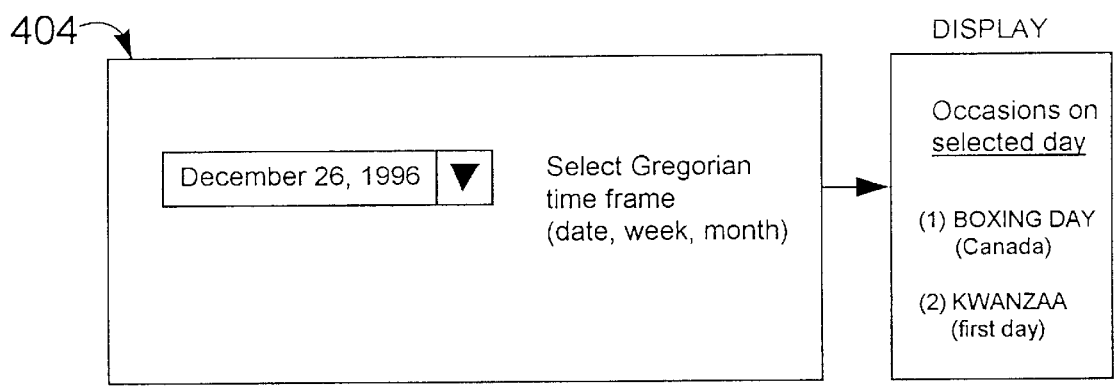
Figure 13:
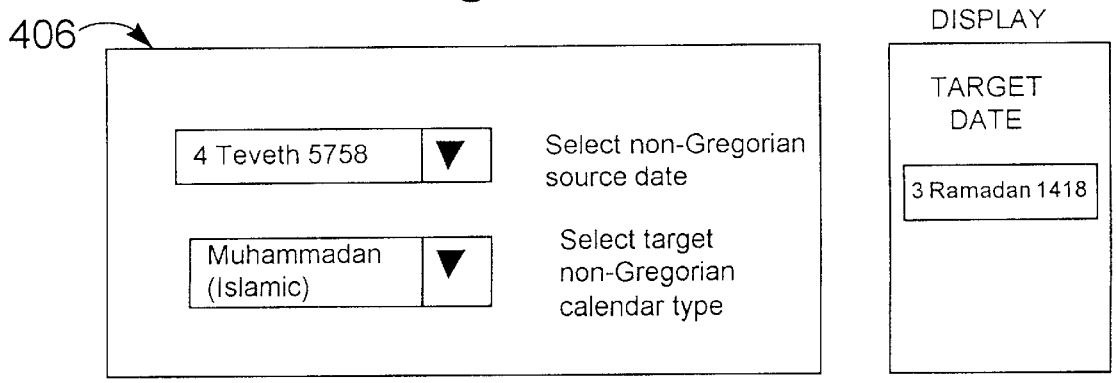

FIGS. 11–13 show alternative user input interfaces and corresponding displays output therefrom. In FIG. 11, a user inputs an occasion and a desired year into user interface 402, and the Gregorian date and date associated with the occasion calendar are output. Occasion information for the inputted occasion may be obtained from the occasion table 400 and displayed as well. In FIG. 12, a user inputs a Gregorian time frame into a user interface 406 and the occasions for that time frame are displayed. The time frame may be a day, a week or a month. In the example of FIG. 12, a specific day was input. As discussed above, the input may be a specified month, date and year, or a word or phrase, such as "today," "tomorrow," "next Monday," "next week," "next month." In FIG. 12, a user inputs a date in a source non-Gregorian calendar type and a different target non-Gregorian calendar type into a user interface 406 and obtains the date in the target non-Gregorian calendar type. In FIG. 12, the device automatically determines the source calendar type from the source text.

Additional user interfaces may be constructed to request and display information in other formats which are obtainable from the date converters 300, 302 or 304, and the occasion table 400.

The device described above may be interfaced with the calendar and date calculation modules disclosed in U.S. application Ser. No. 08/944,923, filed Oct. 6, 1997, entitled "INTELLIGENT AGENT FOR EXECUTING DELEGATED TASKS". Specifically, the calendar and date calculation modules 40, which include the occasion table 400 and date converters 300, 302 or 304, may be used with the intelligent agent device described therein, the description of which is repeated below.

The intelligent agent expedites electronically placed orders, purchases, deliveries or production instructions for a variety of goods and services, and carries out various delegated tasks, in the present or the future or repeatedly over time. The intelligent agent acts like a good executive assistant. The user can quickly delegate tasks to be accomplished (with little or no additional input) either now or in the future (even repeatedly and periodically).

Using the intelligent agent, both payment and delivery can be specified for future occurrence. In addition, the intelligent agent incorporates a learning database that accumulates data on an incremental as-needed basis. The intelligent agent learns terms which it didn't originally know (such as nicknames, shipping addresses, alternate product names, and user's preferences over products) but only requires the data needed for the current task. The intelligent agent remembers the data (like a good executive assistant) as a way to expedite the delegation process of the present task and similar tasks in the future.

In short, the intelligent agent can accomplish action at a distance in both time and space and arrange payment at a distance in time. By acting as an intelligent agent with a learning database, the device uses simple natural language commands to accomplish complex actions. Because it can accomplish these tasks through written, visual, pointing device, graphic and/or verbal commands, the intelligent agent is accessible for the disabled, for those for whom English is a second language and for those with no knowledge of English.

The intelligent agent disclosed herein also teaches a system for reproducing information itself or in material objects, here and now, or in the future, at a point of sale, or when the information originates either at the point of sale, or at a different place or at a different time or times. In addition, the intelligent agent teaches a system for purchaser input to personalize the product or otherwise assist in creation of the product. In addition, the intelligent agent may be implemented as a method of manufacturing other types of material objects that are not the reproduction of information, at point of sale, or at a distance in time and place. In addition, the intelligent agent may be implemented as a method of reproducing such information when the information (or part of it) originates (or is developed) over time from a user's input, in that the learning database accumulates information from time to time and over time. The accumulated information is embodied in or modifies the production or shipping of the manufactured material object. In addition, the intelligent agent teaches a method and system by which such material objects can be ordered using natural language. The intelligent agent also teaches a system for reproducing information with respect to services and intangibles in addition to material objects.

The intelligent agent not only reminds a user about a task or event, but accomplishes that task without further user intervention. The intelligent agent also has the option of requiring the user to confirm a scheduled task just prior to the automated execution of the task or requiring the intelligent agent to send confirmation of execution after completion of the task, as well as interim "progress reports" during the execution of a task that takes place over time.

The intelligent agent introduces and supports a robust new paradigm for personal computing and other computerized or computer-aided devices: allowing end users to delegate tasks for automatically scheduled execution, now, in the future and periodically. The "remind me" metaphor of "to do" lists is replaced when appropriate by a "delegate to the computer" metaphor of "do it" lists.

Many important jobs are put off or forgotten because they might take too long and, though important, have lower priority than other tasks at hand. This includes gathering and entering data into databases. The intelligent agent not only speeds the delegation and execution of many tasks, but incrementally accumulates useful data that might otherwise be lost.

As noted above, the intelligent agent expedites electronically placed orders, purchases, deliveries or production instructions for a variety of goods and services, and carries out various delegated tasks, in the present or the future or repeatedly over time. The instructions to the intelligent agent may be issued using natural language commands (typed, clicked or spoken). Four examples of instructions issued with natural language commands are as follows:

(1) "Send flowers to Jim Smith and his wife on their anniversary."
(2) "Ship piston-rings to Osaka Motors by next Tuesday."
(3) "Make airplane reservations to Cairo for Easter weekend."
(4) "Plan dinner for six with a fish entree and pasta side dish, and limit the salt and cholesterol."

In the first example, by way of illustration, the intelligent agent learns to associate the phrase "Jim Smith and his wife" with a given name such as "James D. Smith" and the more proper "Dr. and Mrs. James D. Smith." It learns to associate that given name with a variety of occasions, dates and shipping addresses. It can also learn the user's preferences for gift items such as flowers (e.g., price range per occasion). The intelligent agent knows how much lead time is needed to ship the product to ensure delivery on the specified date.

Every day the intelligent agent examines which orders must be executed to ensure "just in time" delivery of the required products and services. Then, it electronically orders, purchases, arranges payment for, and/or dispenses the required items. In addition, it may look up orders from previous years (or time cycles) and ask the user if he or she wants to repeat the order in the current year (or time cycle). On the day the intelligent agent is to execute the order, and prior to execution, payment may be accepted (after automatic electronic verification) by pre-entered credit card account, business account or electronic currency. Prepayment is also possible (including by smart card or coins in a vending machine), but not necessary.

The second example illustrates that delegated tasks need not be limited to purchase orders. In addition, it shows that specifying future delivery need not be a specific date but a calculated one. A similar command could require shipment of piston-rings every Tuesday, requiring repeated automated calculations and transmissions. In addition, the example illustrates other learning situations. Here, the intelligent agent can learn what type of piston rings are used by Osaka Motors, what quantity is usually shipped, how it is shipped (based partly on the required delivery date) and the requisite part numbers to affix to invoices.

Some embodiments of the intelligent agent may be able to accept contingent instructions such as "Send piston-rings to Osaka Motors when inventory drops below 100 cases." In this case, inventory levels are obtained by other automated systems or devices, such as bar code readers (e.g., at point-of-sale or warehouse loading docks), or volume or weight sensors. Instructions may contain both contingent criteria and time and date calculations, such as "Send piston-rings to Osaka Motors every Tuesday to maintain inventory levels at 500 cases." The criteria may be based upon mathematical calculations or projections that in turn are based upon data gathered manually or automatically. For example "Send piston-rings to Osaka Motors every Tuesday to maintain inventory at 100 cases above their projected sales," where the projected sales figures are manually or automatically calculated from shipping data obtained manually or automatically from the warehouses or sales offices of Osaka Motors or point-of-sale devices for Osaka motors, which may be located in various places. The examples above illustrate how the intelligent agent may be activated by other automated or semi-automated devices or software.

This example shows how in those embodiments in which the intelligent agent maintains an open architecture, the embodiment can be linked to or embedded in other devices or software, and "called" by these other devices as if the intelligent agent were a module, function, subroutine or procedure. In such embodiments, the intelligent agent can even augment the performance and provide new functional capabilities when coupled with various off-the-shelf software, including spreadsheets, relational databases, and contact managers.

The third example illustrates a future event (e.g., Easter) which cannot be directly calculated from the standard Gregorian calendar, but must be determined by other ways. In addition, the third example illustrates other learning situations: here the intelligent agent can learn that the user always means Cairo, Ill., not Cairo, Egypt, and can learn what type of seating arrangements (first class versus economy, window versus aisle) the user prefers.

Consider a variation of the third example, "Make travel arrangements to Cairo for Easter weekend." This illustrates how a delegated task may consist of performing and coordinating a number of related tasks. For example, making travel arrangements entails not only ordering airplane tickets, but also making hotel reservations, arranging car rentals, reserving meeting rooms, choosing restaurants (and making reservations for them), and arranging for sightseeing tours and entertainment (including purchasing theater or concert tickets). When requested, the intelligent agent also makes arrangements for traveling companions (whether business or family). To accomplish portions of this task (such as choosing entertainment or a restaurant), the intelligent agent may have to query the user on current preferences in the same manner that an executive assistant would ask what kind of food you are in the mood for. In fact, when the task of ordering airplane tickets is given to the intelligent agent, it may query the user about the need for hotel accommodations, car rentals, and the like.

The first three examples illustrate embodiments of the intelligent agent in which information such as addresses and birthdays are downloaded from (or posted to and saved in) the user's existing contact manager software. The third example illustrates an embodiment in which information such as the dates of a conference or business trip as well as traveling companions or participants at the planned out-of-town meetings are downloaded from (or posted to and saved in) the user's existing scheduler or organizer software. In addition, posting an out-of-town meeting on the user's scheduling software triggers a query from the intelligent agent as to whether the user wishes to make travel arrangements. Similarly, posting a person's birthday or anniversary on the contact manager software triggers a query from the intelligent agent as to whether the user wishes to schedule the intelligent agent to order a greeting card or gift.

When products or services are ordered, the transaction amount is automatically posted to the user's electronic accounting software (including electronic checking accounts such as Intuit's Quicken or Microsoft's Money, or customized programs including those using spreadsheets or relational databases). When the user employs the intelligent agent to automatically ship goods or services, the transaction amount is automatically entered into accounts payable. A transaction which involves ordering a tangible product which requires payment may be referred to as a "physical commercial transaction."

The above examples have focused on user originated tasks, but many tasks are undertaken in response to queries, solicitations or directives from others. Such tasks may also be streamlined and delegated using the intelligent agent when the queries conform to the intelligent agent's specifications and architecture.

For example, many political groups send mail to supporters asking the supporters to send donations or to write letters to their political representatives. When the intelligent agent receives electronic mail such as, "Please sign a copy of the enclosed letter and mail it to your Congressman," the user need only tell the intelligent agent "OK" (for example, by clicking an on-screen button labeled "OK"). At that time, the intelligent agent will automatically insert the appropriate Congressman's name and address, affix a digitized version of the user's signature and electronically retransmit the completed letter to a re-mailer such as the Internet company OutPost which will print the letter, place it into an envelope, attach a stamp and place it in the U.S. Mail. (Alternatively, the user could edit the proposed letter on-screen before clicking "OK".) The intelligent agent can also generate and mail follow up letters every week. The user can instruct the intelligent agent to automatically "OK" any such request from his or her favored groups. The intelligent agent can just as easily (and just as automatically) send a contribution using various credit card or electronic payment schemes.

A more commercial application would use electronic mail to broadcast the daily obituaries. The intelligent agent would compare the names of the recently deceased with the user's contact list to inform him or her if any clients (or their relatives) had died, and ask whether flowers or a sympathy card should be sent, e.g., "The mother of Joe Smith, your client, just died, would you like to sent flowers to the funeral?" If the user tells the intelligent agent "OK," it will automatically send an order to a florist for sympathy flowers (the kind and price previously ordered by the user) to be delivered to the funeral home specified in the electronic obituary. The user is not limited to a response of "OK" but can instead choose to send different flowers, or to send a special message with the flowers. Again, the user can instruct the intelligent agent to automatically respond "OK" for pre-selected "top" clients.

In these delegated "response tasks", the intelligent agent acts as an executive assistant who opens the mail, asks the boss whether a reply is appropriate, and then composes and sends the reply. Thus, a response task is initiated as a result of a query automatically received by the intelligent agent.

The intelligent agent is not limited to user originated tasks, or response tasks. The intelligent agent may be delegated tasks which involve interactions (including automated querying, response, re-querying, and other feedback) among several components of the intelligent agent. This is like an executive assistant who is given a task, but must find out certain information from others before the task can be executed. Examples of such tasks include delegating scheduling of a doctor's appointment, or scheduling a meeting among individuals who use different scheduling software. (Current electronic schedulers can service individuals within a work group on one network with the same software, but do not provide this service in a cross-platform manner or between networks.)

Another application with such interactions involves broadcast and point-cast media, such as radio, television, or broadcasts or point-casts over the Internet. When a user hears a tune on the radio that he or she likes, the user presses the "SEND" button on the remote control and the audio CD is automatically ordered. Of course, if the CD is to be a gift, the user must enter the recipient's name and occasion to establish a shipping address and shipping date. When a user hears or sees an advertisement over broadcast or point-cast media, and wants to order the product, the user again presses the "SEND" button on the remote control and the product is automatically ordered. Again, gift items require additional choices. When a user watches a video over the Internet, whether a music video or a situation comedy, clicking on the image of an actor will allow the user to order the clothes, jewelry, and other articles that the actor is wearing. (The intelligent agent already knows the user's size, although the size of gift items must be entered.) Clicking on an object on the screen, such as furniture, an appliance or a painting, allows the user to order that item. For the examples in this paragraph, the broadcast includes purchasing information (not shown on the screen) and the intelligent agent uses that information along with information it has previously stored (such as the user's credit card number and shipping address) to compose and transmit a purchase order.

The fourth example illustrates an interactive embodiment of the intelligent agent which plans and helps cook meals; "Plan dinner for six with a fish entree and pasta side dish, and limit the salt and cholesterol." The intelligent agent first acts as an expert system (e.g., a famous chef such as Julia Childs) to help plan the menus for one meal or a week of meals. The intelligent agent may query the user to establish constraints (e.g., "Do you want spicy or mild?" "How long do you have to prepare the meal?" "How long do you have to eat the meal?") After establishing a menu, the intelligent agent prepares a list of ingredients, altering recipes using previously entered data to accommodate the user's special tastes, dietary restrictions and the number of family members (and planned-for guests). The intelligent agent also keeps a running inventory of food in the user's refrigerator and pantry. The intelligent agent then compares the ingredients list and the inventory list and prepares a shopping list for needed ingredients. The shopping list is automatically and electronically sent to the grocery for regularly (or specially) scheduled delivery. The intelligent agent may also have an inventory of the user's cooking appliances and pots and pans. When the meal is to be cooked, the intelligent agent internally prepares a critical path method using appropriate cookware and appliances to ensure that all the food is done at the appropriate times and in the most efficient manner. The intelligent agent tells the user (on-screen or via speech synthesis) what ingredients to take out of the refrigerator or panty, and when, the order in which to cook items and how long to cook each item. If the intelligent agent is embodied with a screen monitor in the user's kitchen area, the screen may display video demonstrations of special cooking techniques at the appropriate time (e.g., correct sauteing or basting techniques). If guests are to be invited, the intelligent agent can send out invitations when the meal is first being planned. Similar embodiments help plan and carry out home improvement projects (e.g., building a deck or fixing a faucet).

The intelligent agent can share both its learned and preprogrammed database with other computer software such as schedulers and contact managers.

With the intelligent agent a user can order not only flowers, but all goods, services or entertainments which can be ordered or dispensed electronically. The user is able to delegate tasks that occur not only just now but also in the future or on a periodic or repetitive basis. Payment for executing the command and providing the requested goods, services or entertainments need not be made when the command is initially entered, but rather may be postponed automatically until the task is executed. The intelligent agent incorporates an intelligent database that learns new facts (such as shipping addresses) on an incremental and "as needed" basis, and then remembers and utilizes that knowledge in executing future commands. Calculation of periodicity is not limited to the Gregorian calendar but includes other ethnic calendars (such as Chinese, Jewish, Islamic or Hindu), Christian moveable feasts (such Easter) and natural cycles (e.g., lunar or tidal).

The periodicities may be conventional or non-conventional, even when using the same calendar, such as the Gregorian calendar. For example, a conventional periodicity may be "the first Monday of each month." An example of a non-conventional periodicity may be the calculation of Election Day, which is "the first Tuesday after the first Monday in November." Other holidays or events may be related to more than one periodicity. Easter (as celebrated in the Catholic Church) is related to both the solar year and the lunar year; Easter is related to the first Sunday after the first new moon, after the Spring Equinox. Conventional calendaring and scheduling programs do not have the capability of automatically calculating such non-conventional periodicities.

The intelligent agent may be embodied as a stand-alone kiosk, as a kiosk connected to one or more remote devices, as a network of connected devices such as (but not limited to) computers, workstations, telephones, printers and/or fax machines. The intelligent agent may be embodied in other ways as well. The connections may be via one or more of (but not limited to) the following: telephone wires, cable TV wires, wireless communications (including cellular, mobile phone and satellite communications) and other electronic networks including but not limited to the Internet. Payment may be by cash (coins or bills), especially if the intelligent agent is embodied as a kiosk or if input to the intelligent agent is from a pay phone, via credit or debit card, prepaid card or business/personal account, or other electronic currency or payment scheme.

Definitions for Intelligent Agent

The below described apparatus is a stand-alone or interconnected device with electronic components for accomplishing various tasks delegated to the intelligent agent, through one or more output devices, now or in the future or periodically, at times through "natural language" commands and at times aided by intelligent agents and/or expert systems.

The following definitions are provided to promote understanding of the intelligent agent:

The term "periodically", with respect to the intelligent agent, means that a task is executed more than one time, including being repeatedly executed at regular intervals of time (such as the first day of every month, or every Tuesday, or at a specified date once a year), regardless of the time cycle or calendar used and including being executed repeatedly at irregular intervals or indeterminate intervals. The term includes instances where the repetitions are many, where the repetitions are few, and where there is only one repetition. The term includes situations in which the number of repetitions is known at the outset, instances where the number of repetitions is not or cannot be predetermined, and instances in which there could theoretically be an infinite number of repetitions (e.g., delegating the task of sending someone a Christmas wreath every year could theoretically occur forever, but such a standing order would in fact be canceled within a finite time). The term includes instances in which the criteria determining the repetition is well defined, random, or on a contingent or "as needed" basis. Repetitions may be triggered by timing and dating devices as well as other automated sensors, such as bar code readers, photoelectric cells, distance or weight sensing devices, proximity detectors or any device used to detect and or record data, whether or not incorporated into point of sale devices or other inventory control apparatus. For example, various equipment may be used to record commodity or inventory levels. When the commodity or inventory levels fall below a predetermined point, the equipment sends a signal to the intelligent agent to transmit an order to replenish the commodity, or to execute some other action or non-action or change of action. Sensed data may be recorded with a variety of automatic devices including (but not limited to) analog and digital computers, and these recording devices may aggregate the data or use the data for computations or projections (whether of units or profits, or the like) using various hardware and or various mathematical methodologies. These methodologies may impose certain criteria (e.g., logical, statistical, mathematical, electrical) which when satisfied (or not satisfied) cause that device to send a signal which causes the intelligent agent to execute some action or non-action or change of action. Examples of control input include electronic data interchange information and transmittals. Such automatically generated instructions may require confirmation by the user or may proceed to execution without confirmation, or may require post-execution acknowledgment to the user by the intelligent agent that automated action was taken. The intelligent agent may use a rule system to combine both the automatically generated instructions and date or time based calculations of periodicity as well as user input. For example, the intelligent agent may transmit an order on the first of each month, but the amount of the order, and the items ordered are based upon a combination of inventory sensing equipment and computer based sales projections along with user overrides.

The term "stand-alone device", with respect to the intelligent agent, refers to devices including (but not limited to) vending machines and kiosks which create, alter or dispense a physical product or combination of physical products such as, but not limited to, greeting cards, prepaid telephone calling cards, gift certificates, trading cards, printed material of monetary value (including but not limited to money orders, bearer notes, bonds and certificates of deposit), lottery tickets (where legal), coins and currency, or microchip (with sound clips including voice greetings, or image clips including video of still or moving images) and which then dispense it directly. The term also covers devices which personalize products by way of automated engraving or pressing (e.g., for brass or metal items), automated sewing (e.g., for monogrammed polo shirts) and printing on other media (e.g., stickers, decals or iron-on transfer paper). The term also covers devices in which the product is dispensed to a common carrier such as Federal Express or the U.S. Post Office for delivery. In addition, the term includes vending machines or kiosks which create, alter or dispense an electronically encoded product or combination of products (such as a bit-mapped image file, sound file or text file), electronic currency, electronic gift certificates or electronic versions of the physical objects mentioned in the first sentence under "stand-alone device" for transmission directly to a receiving device owned or used by the person the purchaser intends to receive the product, including but not limited to fax machines, printers, television sets and computers. In addition, the term includes vending machines or kiosks which physically dispense or electronically transmit instructions or keys (including but not limited to PIN numbers) to access on-line products, services, messages, currency or entertainment. In addition, the term includes vending machines or kiosks which create, alter or dispense a combination of any products or product types including, but not limited to, the products and product types mentioned above. The term also includes both devices which accept payment (including but not limited to cash, credit cards, debt cards or smart cards) and devices which do not themselves accept payment but require payment to be made to a clerk at a nearby sales counter. The term also includes a device which requires a clerk at a nearby sales counter to authorize the transaction via a simple switching device. A stand alone device may include a credit card reader and verifier, cash receiving equipment, an alphanumeric keyboard, one or more video screens, a voice synthesizer, a color printer printing on blank or partially printed card stock as well as gift table memory and encoder. Input devices include alphanumeric keypads, numeric keypads, pointing devices (including but not limited to track balls, mouse pointers, and touch pads), touch screens, handwriting input pressure pads or light pens, various digitizer pads, scanners (including those for graphics, text and handwriting), optical character recognition modules, handwriting recognition modules and voice recognition modules. The handwriting input pressure pads may be used as part of credit card verification, or as input for adding signatures or handwritten message to the product which can be personalized via the other input methods. The scanner may be used for adding signatures, graphics or messages to the product, as well.

The term "stand-alone device", with respect to the intelligent agent, also refers to devices which automatically send orders or requests or data to third parties for processing, such as flower-ordering kiosks directly connected to a dispensing florist or the FTD wire-network, regardless of the manner of sending the orders, requests or data. The essence of this type of stand-alone device is automated taking of the order and automatic calculation of the time to ship the order, followed by automatic notification to the third party of the order and delivery date at an appropriate time to insure "just in time" delivery of the item.

The term "interconnected device", with respect to the intelligent agent, refers to devices which perform the same functions as the aforementioned stand-alone device, but which distribute the physical and electronic components among two or more locations and connect those components so that electronically encoded data can pass between and among them. The connection may be via wire, conduit or other substance through which electrical signals can pass, fiber-optic cables or other material through which light waves or other electromagnetic radiation can pass, via air or vacuum through which radio or other electromagnetic waves can pass. The connection includes any combination of the above, as well. An example of an interconnected device is a device similar to the stand-alone device, but with an essential component located at a nearby counter with a salesclerk. The essential component might be the credit card verifier, the printer, or a second keyboard for debugging, entering essential information or editing the personalized products. Similarly, several otherwise standalone devices located in one department store or shopping mall might share a single printer, a single modem for transmitting and dispensing electronic items, or a single central processing unit. The term includes systems in which the central processing unit is not located in one place but rather distributed, where input is distributed, and where memory and data storage may be separate from the computational components (which themselves may be centrally located, located at various central places or distributed). In other words, parts of the computations may be performed at different locations and parts of data may be stored at different locations. Computation and memory systems may include but need not include redundancies. The term interconnected device includes both hardwired components, and networked systems of components. The term includes but is not limited to systems of mainframes connected to dumb or smart terminals, personal computers or workstations, systems of client/servers connected to personal computers and workstations, and mixtures of such systems. The term interconnected device includes distributing the components over a network of networks such as the Internet. The term includes on-line computer access, interactive television access, and telephone access, where the input is through components (including but not limited to personal computers, interactive televisions, telephones, pagers, electronic organizers, electronic rolodexes, personal digital assistants, ATM money machines, fax machines, scanners, and handwriting input devices) owned by various parties and possibly used for other purposes which may not be covered by the intelligent agent. This term applies regardless of which part of the creation, recollection, or dispensing of the product is distributed. As such, the term interconnected device includes software and/or hardware which enables a personal computer, interactive television or telephone or other home or office machine or appliance to become part of an interconnected device for the purposes contained herein or enable such machines to simulate the workings of a stand-alone device or an interconnected device for the purposes contained herein. The term also includes software regardless of how distributed, and whether hardwired into the machine, hard coded into its operating system, written to hard disk or permanent memory, or into temporary storage (including but not limited to CD-ROM and floppy disk), or temporarily residing in the machine via a Java-type applet downloaded from a server or off a network such as the Internet.

The term "interconnected device", with respect to the intelligent agent, includes software and/or hardware which enables a user, a sensing device, computer (or other) hardware, or software to delegate a command to or transmit an instruction to, or otherwise trigger an action by an interconnected device or an object which simulates the workings and/or actions of an interconnected device, even though owned by various parties and possibly used for other purposes which may not be covered by the intelligent agent. For example, to the extent that off-the-shelf software such as (but not limited to) relational databases or spreadsheets trigger an interconnected device or delegate a task to an interconnected device, or embed or link an apparatus with another program, or call a function, module, procedure, or subroutine. which acts as an interconnected device, or itself triggers or delegates a task to or embeds or links an apparatus with an interconnected device, the off-the-shelf software during such triggering, delegating, embedding or calling is part of an interconnected device, even though for other purposes the off-the-shelf software might not be covered by the intelligent agent. An interconnected device includes a device which connects to more than one interconnected devices. The term interconnected device includes the situation when two or more interconnected devices link or communicate with one another, including ascertaining tasks, breaking them up into smaller parts, and distributing the partial tasks between or among the interconnected devices in forms of inter-device task delegation and also including situations in which the several interconnected devices must provide each other with information on a one time, repeated or on-going basis in order to accomplish the complete task or its partial components.

The terms "stand-alone device" and "interconnected device" include both when the services and products are sold as well as when they are given away or exchanged for value. The terms apply whether payment is cash, smart card, electronic cash, cash equivalent, credit card, debit card, other credit or debit account or arrangement, or exchange for some other thing of value or no value.

The term "task", with respect to the intelligent agent, refers to purchasing, ordering, creating, altering, personalizing, dispensing, or distributing a product or service or entertainment or other things of value, whether tangible or intangible, whether physical or computer code, or encoded data. The term also includes issuing or expediting purchasing, shipping or production orders, or other task amenable to electronic data interchange and any other task, job, or assignment which can be electronically automated by delegating to a stand-alone or interconnected device using an intelligent agent, including delegation via natural language commands as delineated or illustrated in this patent application.

The term "task" also refers to reserving or otherwise making reservations for products, services, entertainment or combinations thereof, or otherwise ensuring the availability of the products, services or entertainment, with or without payment for such reservations, and with or without payment (full or partial) for such products, services or entertainment. For example, this includes not only hotel and restaurant reservations, and airplane ticket reservations, but also an electronic version of retail "layaway" plans for goods and services. The term task includes providing planning and logistics for interconnected and more complicated tasks involving a variety of vendors or services, for example ordering everything for a business trip which might include, plane tickets, car rental, hotel accommodations and a dinner party. The intelligent agent may obtain crucial event specifications or scheduling issues from memory or current input and then delegate these interrelated tasks to linked or embedded interconnected devices with sufficient feedback loops between the modules to ensure compliance with specifications. The term "task" is meant to include all the various forms of scheduling or tracking of appointments, meetings or other tasks or scheduling data entries used for those appointments, meetings or other tasks.

The term "natural language command", with respect to the intelligent agent, means a command or request which is understood by the intelligent agent and could occur in spoken conversation between two people: one person and a subordinate to whom a task is being delegated. The recognized commands depend upon the task at hand and a particular intelligent agent might recognize only one "sentence" or syntax of command appropriate to the tasks it has been designed to accomplish. The term includes not only commands given in English, but in any other language, whether spoken, mouthed, written, signed (including sign-language for the deaf), or visualized. Both stand-alone devices and interconnected devices may, but need not, use natural language commands.

The term "intelligent agent" means a device, or method which enables a device, to simulate the knowledge base or problem solving abilities of a human executive assistant or agent. The term includes databases (whether or not incrementally gathered) which "learn" relationships, substitutes, nicknames, user preferences, personal euphemisms, and the like. As an example, the intelligent agent can be taught that the phrase "Bill and Patti" refers to "Mr. and Mrs. William Jones, III" and that they have a particular address, or phone number, with particular likes and dislikes, so that when the user inputs "Bill and Patti" the intelligent agent can supply other additional essential information necessary for the task at hand. The term intelligent agent includes databases which generate a profile of user preferences by interactive questioning, by recording a history of the user's actual choices, or by some other means or combination of means. The term includes databases which use such profiles to create inference ranking rules that would suggest which choices an individual most prefers or which alternatives an individual might prefer (even if not yet faced with that choice). The term includes programs or methods based upon relationships and likenesses among possible choices, as well as rankings determined by polling like-minded or similarly preferenced individual (such as but not limited to the Firefly system on the Internet, by which individuals list favorite records or books, the program groups individuals with similar likes, and then infers that other records or books enjoyed by an individual would be enjoyed by similar individuals even if the similar individual had not listed the records or books). The term also includes programs which search out information, data, products, merchants, services, and the like. which meet pre-specified criteria. For example, an intelligent agent could search for the best price for a particular product, the best quality among similar products (according to some ranking organization such as Consumer Reports), or the "best" ratio of price to quality (according to some rule or rules, ranking organization such as Consumer Reports, or even expert system as defined below). As further example, an intelligent agent could search for the "biggest" rose, or the "shortest" layover time in an airplane flight schedule. The criteria might be generated by internal rules, specified by the user, or inferred from prior user choices. The term intelligent agent refers to a device or software which accomplishes one or more of the above or similar operations.

The term "expert system", with respect to the intelligent agent, means a device or program which enables a device to simulate the knowledge base or problem solving abilities of a human expert in a particular field or fields. The term includes programs which either mimic or attempt to simulate the decision tree and choice rules which an expert uses to diagnose a problem (such as a doctor diagnosing an illness or an auto mechanic analyzing the source of a mechanical problem in a car engine), propose solutions to the problem (such as a doctor writing prescriptions for a patient's illness that do not create bad reactions with the patient's other prescriptions), find relevant information from extended or extensive databases, or otherwise apply rule based systems of logic and inference to problem solving (or problem defining) activities. The term includes both systems designed for well defined problems, as well as those designed for amorphous situations. The term includes both systems relying on "hard and fast" rules as well as those incorporating "fuzzy" logic or probabilistic decision analysis. In addition the term includes both systems incorporating deductive reasoning from known premises, and inductive reasoning from observations (such as but not limited to the use of Bayesian estimators). The term includes all such rule based systems regardless of the mathematical methodology or logical structure used to develop or implement the rules. In the context of gift giving, expert systems can simulate the advice of Amy Vanderbilt or Martha Stewart on the properness, appropriateness or good taste of a particular gift. The human counterpart exists in high-end department stores such as Nordstrom's which offer customers the service of "personal buyers" to help select merchandise for the customer. In the particular context of sending flowers or plants, an expert system can advise which plants grow best in the intended recipient's place of residence as well as on issues of etiquette. For example, the expert system might inform a user that a wreath is not an appropriate gift to give to a Jewish family because wreaths have become a Christian symbol signifying the resurrection of Jesus. The term "expert system" applies both to a program or device actively called upon by the user for advice, as well as a program which offers unsolicited advice (such as error messages). In addition, the term applies both to a program which gives "advice" as well as one which works in the background, helping choose, categorize or rank options.

The term "output device", with respect to the intelligent agent, refers to a device for executing a task. The output device may be a physical device, such as a product dispenser or a device which makes a product, or the output device may be an electronic or virtual device, such as a modem or display screen which communicates tasks to be executed to a service provider. To further explain the electronic or virtual output device, consider, for example, the task of ordering flowers. The output device becomes the medium (or media) which provides the instructions to the florist shop that is designated to prepare the order, and may include a modem, a printer or a screen display. The output device may also be a device connector which interconnects a plurality of devices which are required to perform the requested task.

Detailed Description of Intelligent Agent

Figure 14:
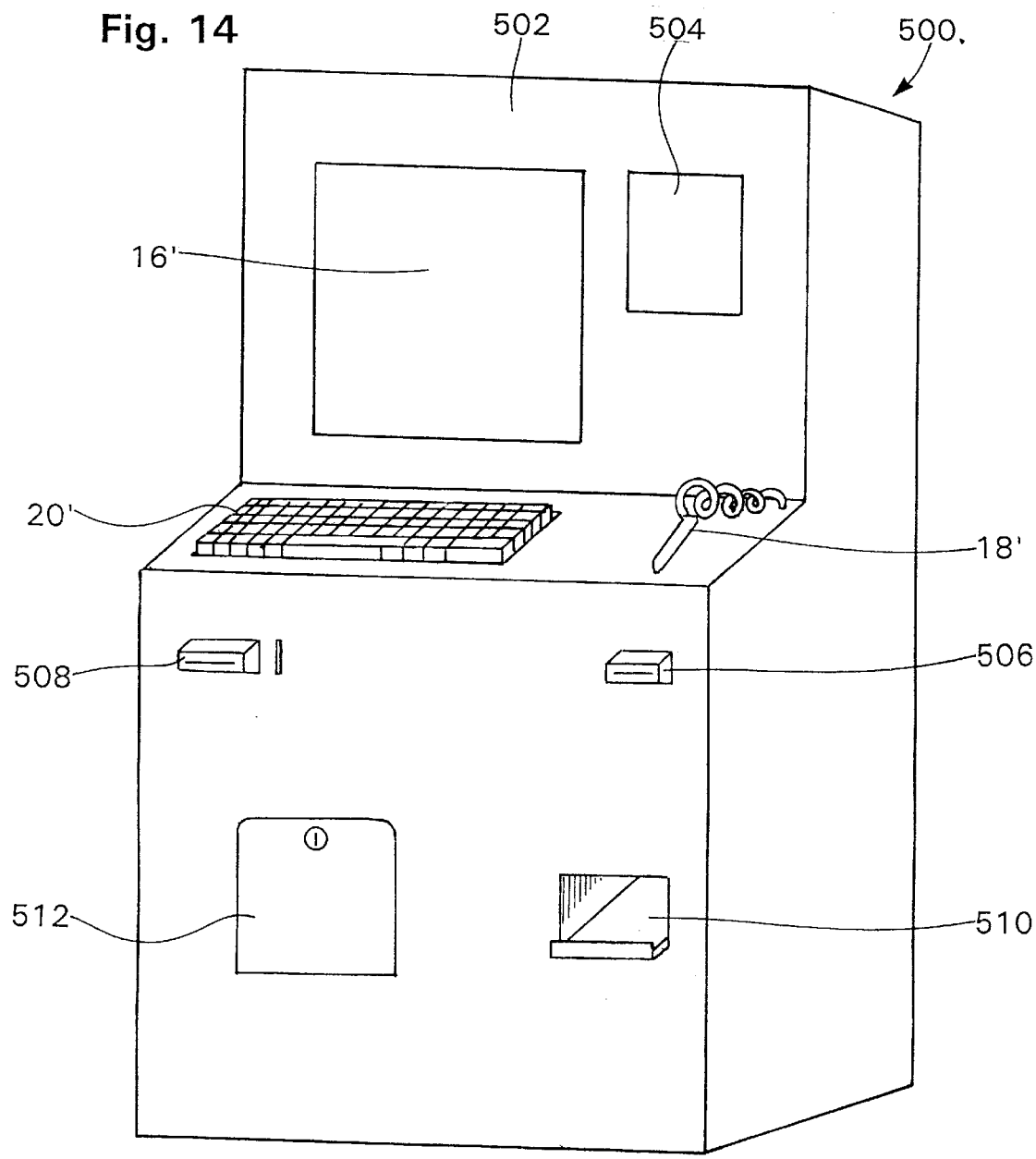
FIG. 14 is a perspective view of a stand-alone electronic apparatus for dispensing personalized greeting cards and gifts, in accordance with a first embodiment of an intelligent agent.

Referring to FIG. 14, the numeral 500 generally refers to a kiosk for dispensing products or ordering products and services, for present or future implementation. A video display 502 may include a pair of display screens 504 and 16' which need not be the same size. One or more of the displays 16' may include a transparent interactive overlay to act as a touch screen, by which the user may use his or her finger as a pointing device. A pointing device 18', such as a stylus or light pen, is also shown which may select items from the screen or enter handwriting including signatures to an order to personalize objects. An alphanumeric keyboard 20' is affixed to the intelligent agent for data entry of alphanumeric and other information. A credit card reader 506 and currency receiver 508 provide alternative methods for users to pay for the services rendered. Those finished products produced by the intelligent agent itself for immediate delivery are dispensed via the out-tray 510. For products to be dispensed in the future, a second out-tray is provided. The second out-tray is not visible or accessible by a user of the device, but is a receptacle within the machine, accessible by key 512. Once each day, the finished items stored inside the machine are removed by a service person for shipping.

Figure 15:
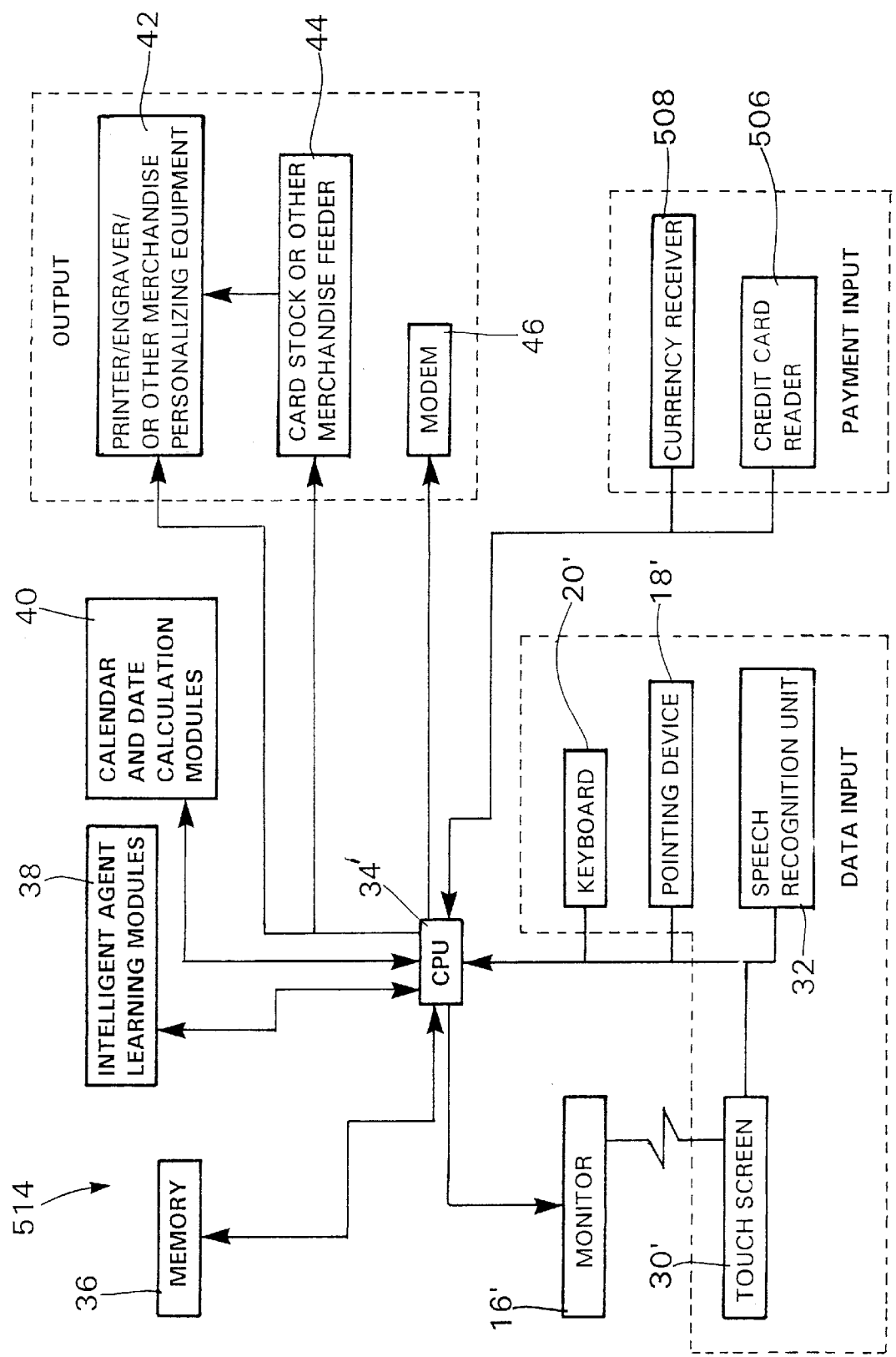
FIG. 15 is a schematic block diagram of the electronic apparatus of FIG. 14.

Referring to FIG. 15, a block schematic diagram 514 of the intelligent agent 500 is illustrated. A programmable CPU 34' includes various kinds of memory 36 as well as intelligent agent learning modules 38 and a calendar and date calculation module 40 either of which may be hard coded into the CPU 34' or onto a separate connected microchip. The CPU 34' is connected to various data input devices, such as the keyboard 20', the pointing device 18', which may be a mouse, track ball or other digitizer, a speech recognition unit 32, or a touch screen 30'. The CPU 34 is also connected to payment input devices such as the currency receiver 508 and the credit card reader 506. In addition, the CPU 34' is connected to the interactive screen or display screen 16' and to a modem 46. The modem is used to dial preprogrammed credit card verification facilities to confirm credit availability for a user who inserts a credit card into the card reader 506 which may or may not require input of a personal identification number or PIN via the keyboard 20'. Alternatively, the user may enter his or her credit card number or credit account solely via the keyboard.

One or more output devices are connected to the CPU 34', including equipment 42, card stock or other merchandise feeder 44 and a modem 46. The feeder 44 stores and feeds merchandise such as card blanks, brass plate blank, or telephone calling cards, to a printer or other equipment 42 for personalizing and encoding the merchandise. The modem 46 is used to verify payment input such as credit cards and also to transmit electronic products or services, or order such services. It may be used to schedule pick up of items ordered in the past for creation "today", and which will be created and dispensed to an internal, locked out-tray 512.

Figure 16:
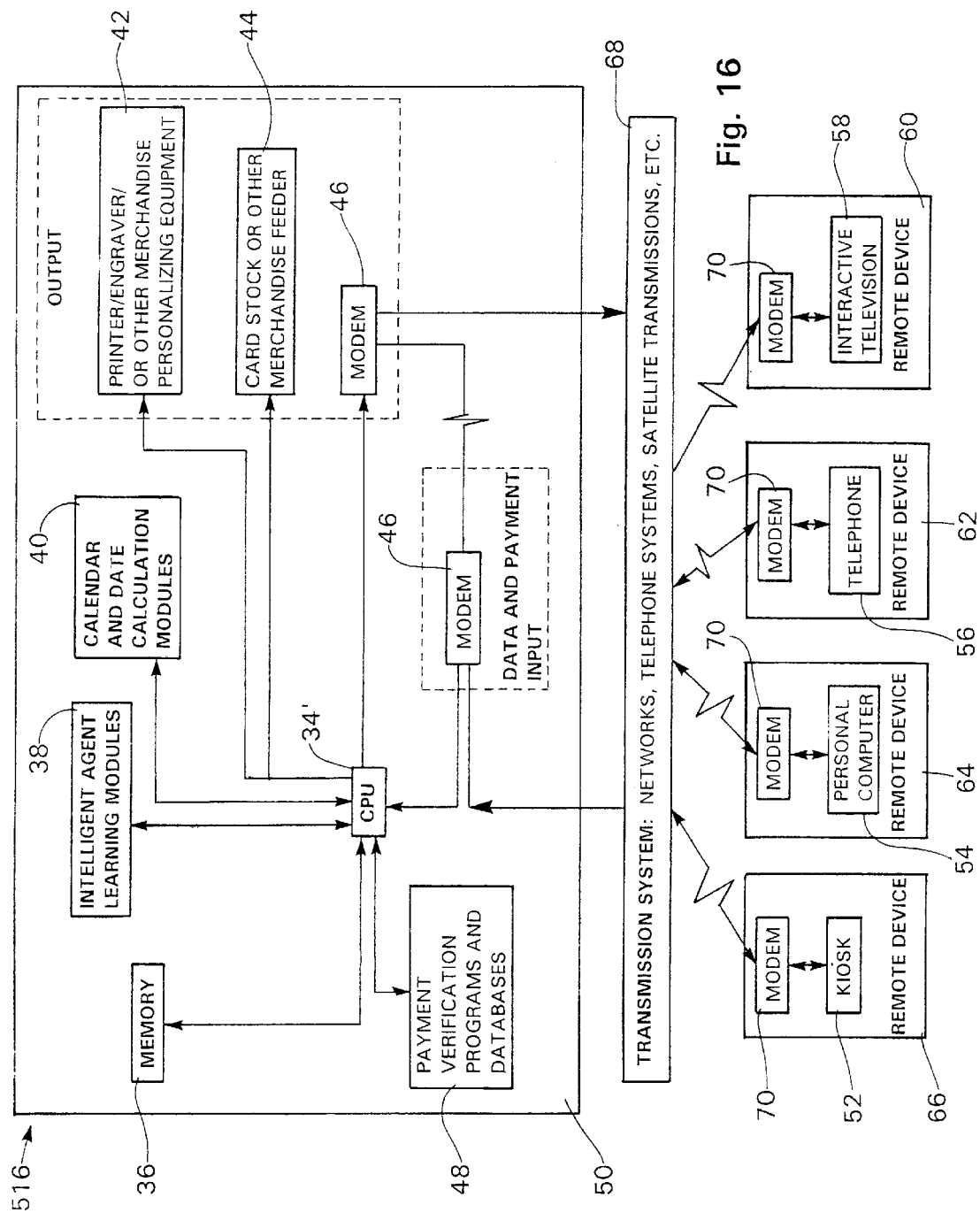
FIG. 16 is a schematic block diagram of an interconnected device for ordering, creating, and dispensing products and services, or carrying out delegated tasks, in the present or future, in accordance with another embodiment of an intelligent agent.

FIG. 16 illustrates a block schematic diagram 516 of an alternative embodiment of the intelligent agent in which an interconnected device includes the intelligent agent in FIG. 14 as a central hub 50 of the system or as one of the remote devices 60, 62, 64, or 66 connected thereto. The central hub 50 may act as either a mainframe with "dumb" input devices, or as a server with "smart" input devices in a client/server architecture. The central hub contains a CPU 34' with various kinds of memory 36 and includes intelligent agent learning modules 38 and a calendar and date calculation module 40 either of which may be hard coded into the CPU 34' or onto a separate connected microchip.

Input is provided via the various remote devices 60, 62, 64 or 66. Each remote intelligent agent, whether a kiosk 52, personal computer 54, telephone 56, or interactive television 58, includes or is attached to a modem 70 which digitizes and encodes the input data for transmission. The data is transmitted to the central hub or server 50 through a communication medium or transmission system 68 which includes networks (such as the Internet), telephone systems (public and/or private), radio wave, microwave, and satellite transmission systems. At the central hub, a modem 46 reconstitutes the data into an electronic form usable by the CPU 34'.

Payment for products and services is made by the user at the remote devices (60, 62, 64 and 66) using devices such as (but not limited to) credit card readers, currency receivers, credit card numbers entered via an alphanumeric keyboard, or voice which are not shown here. The information is transferred via modem 70 and the transmission system 68 through the central hub's modem 46 to the CPU 34'. The CPU employs the modem 46 to dial preprogrammed credit card verification facilities to confirm credit availability, using payment verification programs and databases 48. (The central hub unit may have one or more modems to perform the input and output operations.)

Referring to FIG. 16, one or more output devices are connected to the CPU 34', including equipment 42, card stock or other merchandise feeder 44 and a modem 46. The feeder 44 stores and feeds merchandise such as card blanks, brass plate blanks, or telephone calling cards, to a printer or other equipment 42 for personalizing and encoding the merchandise. The modem 46 is used not only to verify payment input such as credit cards, but also to transmit electronic products or services, or order services. It may also be used to schedule pick up of items ordered in the past for creation "today" and to order products and services for shipping by third parties or remote storage facilities.

The remote devices (60, 62, 64 and 66) may have their own CPU's, memory facilities, intelligent agent learning modules and/or calendar and date calculation modules (not shown). In such circumstances, a remote device may transmit orders to the central hub only on the day of required dispensing or shipment.

An Illustration of Data Input and Learning

The illustration is most easily understood in terms of an interactive device to which a user has frequent access, such as a desktop personal computer, dumb terminal connected to a network, or a kiosk in an office so that users will be repeat customers. The intelligent agent learning modules are useful only for repeat users. In a situation where repeat users are unlikely (perhaps a high volume shopping mall), the learning portion of the intelligent agent might be omitted. The unique ability of the intelligent agent to carry out tasks such as ordering products and services in the future is not impaired. The illustration is based upon the first example mentioned above: "Send flowers to Jim Smith and his wife on their anniversary."

Each repeat user is assigned a password or user identification number. The password or user identification number might be assigned by the system operator or administrator prior to a user's first use of the intelligent agent. In an integrated computer system, a user might have the same password to access both the portions of the computer which embody this intelligent agent, and other portions of the computer which perform other tasks, such as word processing, or accounting. Alternatively, the intelligent agent might assign a password to the user on his or her first use of the intelligent agent or the intelligent agent might let the user pick his or her own password that the intelligent agent then remembers. If the user's access to the interactive intelligent agent is via software installed on his or her own computer, the password might be assigned or chosen as a part of the setup and installation procedure of the software. Alternatively, the intelligent agent might be programmed to accept a user ID issued by a third party (e.g., a credit card number, PIN number or social security number) as a valid ID. Rather than a password, a intelligent agent might use other user identification procedures, such as retina scans, finger print scans or vocal identification, with requisite hardware incorporated into the intelligent agent. If the user's access to the interactive device is via software installed on his or her own desktop terminal or computer, "logging on" to the computer or computer system using that user identification number and password, may also automatically "log" the user onto the intelligent agent. In such a case, the enabling software resides as a memory resident program (like many scheduler and organizer programs) which is loaded when the machine is first booted up, but remains "dormant", with minimal use of machine resources until the user calls upon the intelligent agent ("logs on") by clicking an icon, pressing a special key or combination of keys, or issuing a special voice command. In such an embodiment, the user, as part of the installation procedure, enters certain essential information for purchasing and delivering the items, such as his or her own name, return address, credit card number(s), and preferred closing ("Sincerely yours, Ben").

If repeat users are unlikely (as in a high volume shopping mall) and the learning portion of the intelligent agent is omitted, "logging on" consists of pushing a Start button, or inserting currency, or a credit care. Alternatively, the payment operation (including entering the user's PIN number) might occur after the item to be sent had been selected and confirmed.

In some embodiments of the intelligent agent, including stand-alone kiosks, payment is made at the time the order is placed, by currency or credit (or debit) card. Some such embodiments permit the user to enter his or her credit account for later debiting when the order is executed. In other embodiments of the intelligent agent, with expected repeat users, the intelligent agent learns the user's account number(s) (e.g., credit card, debit card, merchant account). Learning credit account numbers may take place at set up or first use. Alternatively, learning payment procedures may occur "prior" to a particular individual's use of the intelligent agent, as when a company account is assigned to a user by a system administrator along with the user's identification number and/or password. As with shipping addresses, the intelligent agent can learn multiple account numbers and can permit the user to choose which one to use for this order. In the embodiment described in FIG. 18, which describes placing and executing an order, the payment method and account number are assumed to have been assigned or otherwise learned by the intelligent agent, prior to the described order being entered. For this reason, the intelligent agent learning modules for entering, learning and choosing payment methods and accounts are not shown in the flow diagram of FIG. 18, although the payment learning modules are incorporated in the intelligent agent and this intelligent agent contemplates alternative embodiments in which such intelligent agent learning modules learn payment procedures at other points in the flow diagram.

Figure 18:
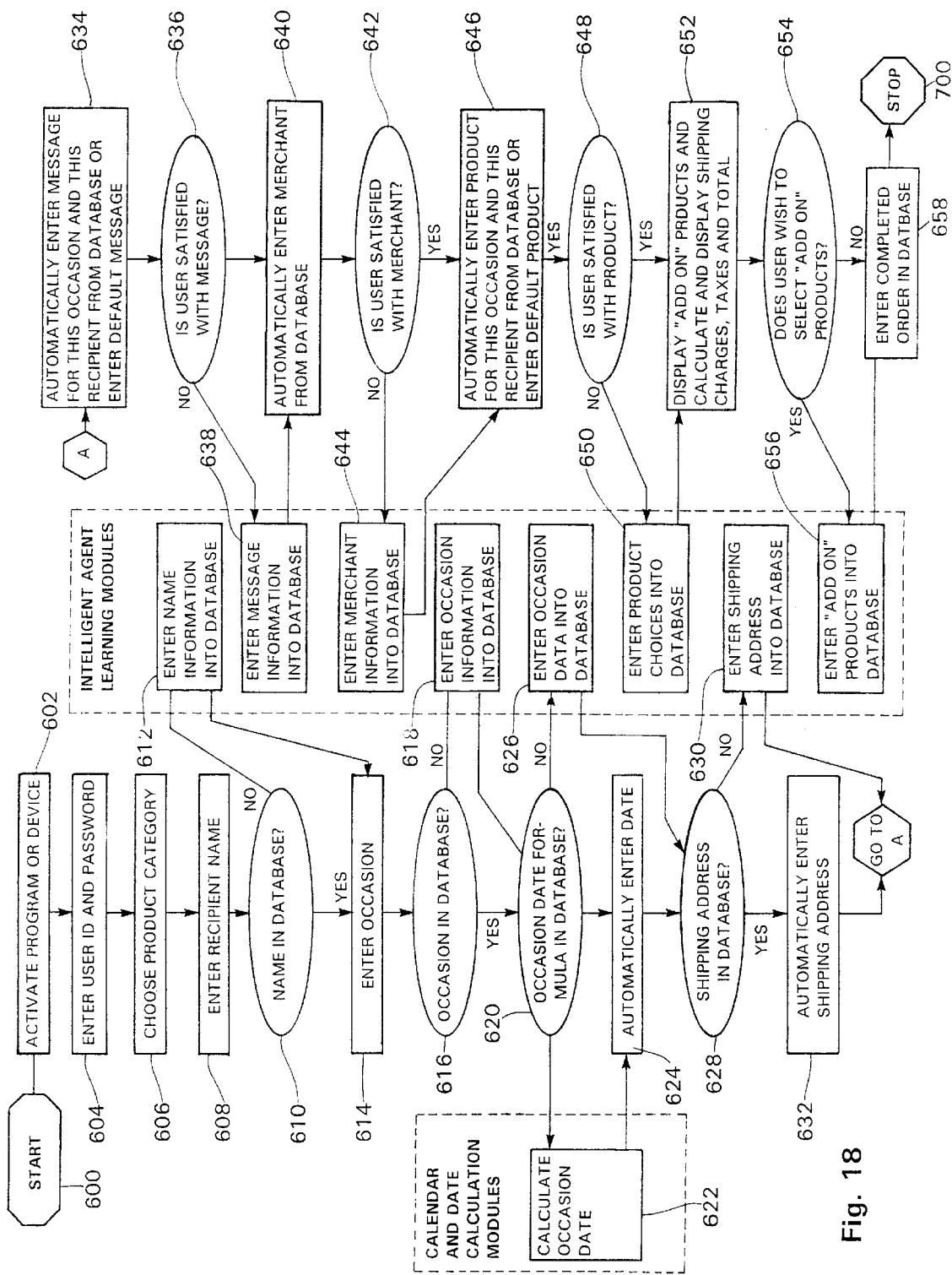
FIG. 18 is a flow diagram of a method used to access the product and service database and create a database of learned data and relationships in the process of ordering products and services or delegating tasks from a remote device of FIG. 16.

In any event, referring now to FIG. 18, the user first "logs on" to the intelligent agent (step 600), activating the program or intelligent agent (step 602). The user then enters his or her password and user identification number (step 604). (In alternative embodiments, the intelligent agent initiates and completes some other procedure to identify the user.)

Figure 17:
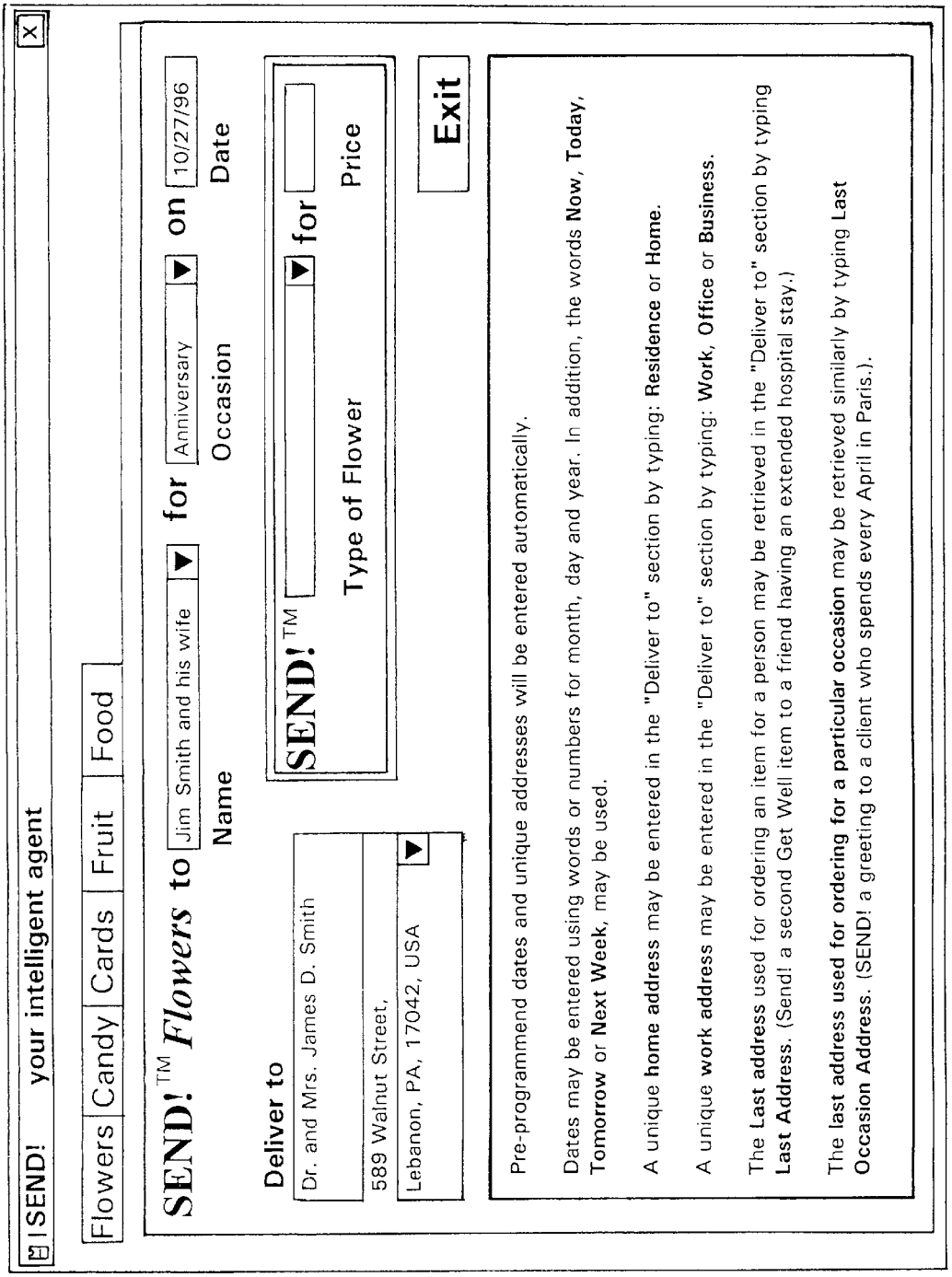
FIG. 17 is an illustration of a representative menu for a personal computer or interactive television for ordering products and services or delegating tasks in accordance with a remote device of FIG. 16.

FIG. 17 shows the first screen that might appear to the user on the intelligent agent's video screen or monitor (after user identification (step 604)). FIG. 18 shows a flow diagram of the method employed. Instead of flowers, the user may choose to send some other gift item, such as candy, greeting cards, fruit baskets or gourmet food. To do so, the user clicks (or tabs to and presses enter) on one of the shown tabs (step 606). The form then changes (although perhaps only slightly) to reflect the kind of gift being chosen. (For example, instead of "SEND!Flowers", the form may read "SEND!Candy".)

Not shown are tabs which allow the user to choose which natural language will be employed on screen (e.g., English, as shown, Spanish, Japanese) With certain embodiments of the intelligent agent, choice of language is omitted or made at first installation, at initial set up, or at first use. Not shown are portions of the learning modules by which the intelligent agent learns which language the user wishes to use. Choice of language affects a variety of default settings such as the message to be sent. To the extent that different languages represent different cultures, default choices of message content and product to be sent, are affected. For multi-lingual users, the choice of language may depend upon factors such as the intended recipient, or the recipient's shipping address. Intelligent learning modules (not shown) learn these associations and automatically present (or change to) the appropriate screens and enter the appropriate default choices.

The user then enters the name of the recipient of the gift (step 608) (in the example, "Jim Smith and his wife"). The name can be typed in, or chosen by point and click from a drop-down combo list. If the name is already on the list, when the user types the first few letters of the name, the intelligent agent's program automatically completes the name. If the name is not on the list, the intelligent agent asks if the entered name is a new name (step 610) (via pop up message or voice synthesized response). If the user answers that the entered name is a new name, he or she is requested to enter name information into the database (step 612), including the "title" (e.g.,Mr., Mrs.) for shipping label purposes. (In the example it would be "Dr. and Mrs.") The user is also asked to associate an existing "contact" name with the new name or enter a new "contact" or proper shipping label name. (In the example it would be "James D. Smith".)

The user then enters the occasion for the gift (step 614) (e.g., a birthday or anniversary, or holiday such as Easter). The occasion can be typed in, or chosen by point and click from a drop-down combo list. If the occasion is already on the list, when the user types the first few letters of the occasion, the intelligent agent's program automatically completes the occasion. If the occasion is not on the list, the intelligent agent asks if the entered occasion is a new occasion (step 616) (via pop up message or voice synthesized response). The intelligent agent then prompts the user to properly enter and categorize the occasion (step 618).

If the user had previously entered the recipient's name and occasion (or the occasion is a pre-programmed one such as Thanksgiving, Christmas or Rosh Hashanah) and the recipient's address, the user can skip down to the choice of flowers (or other gift) and the intelligent agent enters the date and address automatically (steps 622, 624, 628 and 632).

Otherwise, the user must enter the date of the occasion which the intelligent agent puts into its memory (step 626). The user may type the date (e.g., using numbers like "10/27/96" or using words such as "Oct. 27, 1996"), or may use words such as "Now", "Today", "Tomorrow", and "Next Week". In addition, the user may click on those words highlighted in the on-screen instructions.

If the posted date has just past (e.g., within the last week) the intelligent agent queries the user as to whether the gift is to be sent the current year (albeit late) or whether the order is to be scheduled for next year.

If the user has previously entered one unique address for the "contact", the intelligent agent enters it automatically (steps 628 and 632). Otherwise the user must enter an address (step 630). The address can be typed or (in the case of a contact with multiple addresses) clicked on from a drop-down combo list. Again, if the user begins typing the address, the intelligent agent's program automatically completes the address after the first few keystrokes. In addition, the user can type in works such as "Home", "Residence", "Office", "Work", or "Business". The intelligent agent recognizes such shorthand words and enters the appropriate address if one has been uniquely so categorized. As above, the user may instead, click on the words where highlighted in the on-screen instructions. As explained in the on-screen instructions, the user may also click on (or type in) the words "Last Address" or "Last Occasion Address" to access other addresses learned by the intelligent agent.

The intelligent agent can pull information such as addresses, spouse names, anniversaries and birthdays. from other databases that maintain an open format such as Microsoft's Schedule +(a contact management and scheduling program). The intelligent agent also automatically posts information to such databases, so that the information which the intelligent agent obtains is accessible for other uses and programs. Alternatively, the intelligent agent can incorporate its own contact management and scheduling programs with other appropriate forms for data entry and display.

Figure 19:
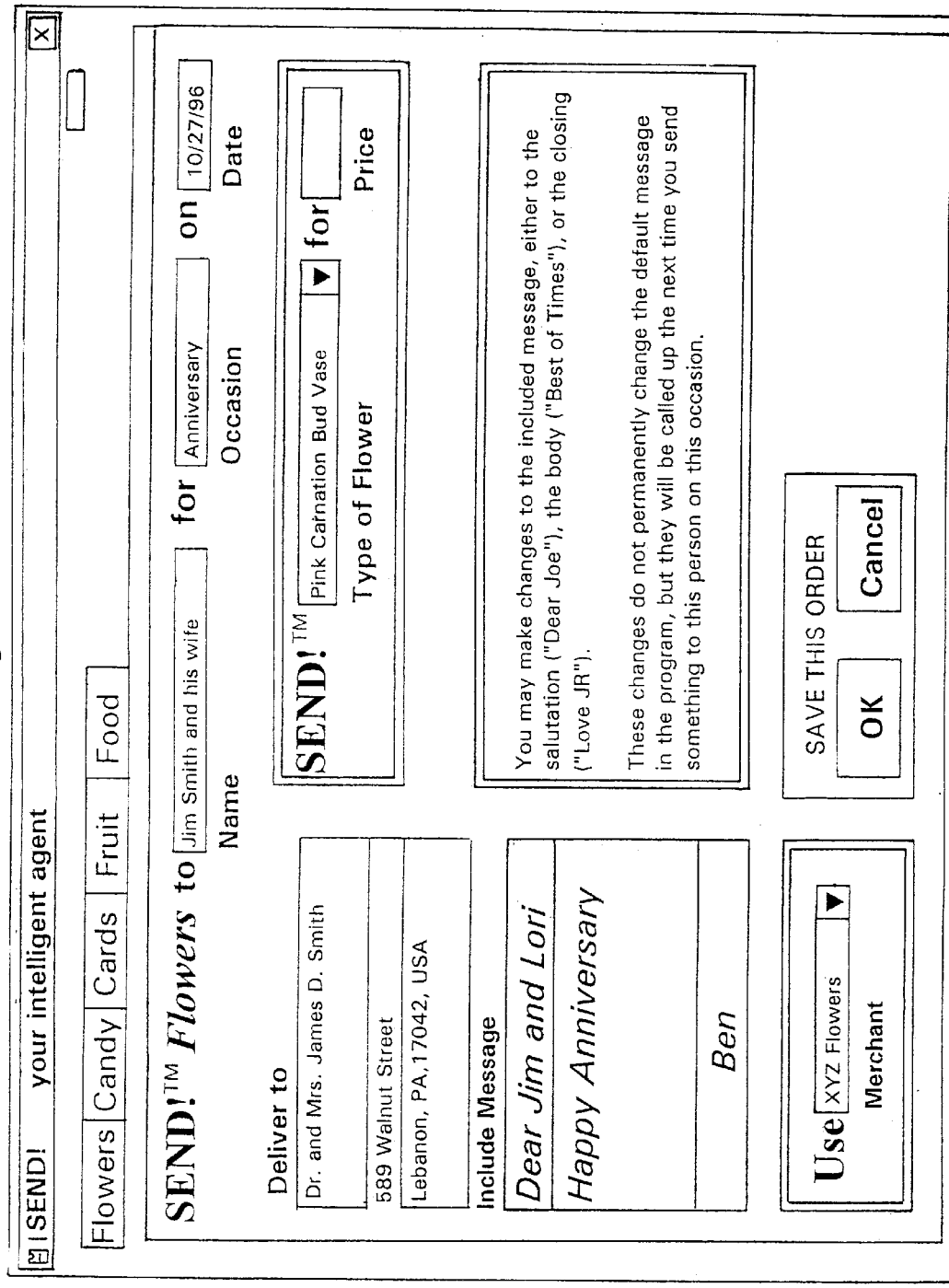
FIG. 19 is an illustration of a representative second screen on the representative menu of FIG. 17.

In any event, once the first screen has been filled in with appropriate entries, and the user moves by tab or click to the "Type of Flowers" field to make a gift choice, portions of the screen change as shown on FIG. 19.

The intelligent agent generates and displays a proposed message to be included with the gift which is appropriate for the occasion (step 634). Salutations, Message, and Closing can be changed (steps 636 and 638) and the intelligent agent remembers the changed salutations, changed message and/or changed closing (collectively, the "new message") as associated with the current occasion and contact. A future gift to the same contact for the same occasion (i.e. the next year) generates the new message as the proposed message (step 634).

The proposed merchant who will ship the gift is displayed (step 640). Choices may be available from a drop-down combo list (steps 642 and 644). The default choice may be generated by the state, city or zip code of the intended recipient.

The user does not have to alter the message or merchant information if he or she doesn't wish.

A default type of flower is shown (step 646). The type of flower will be the same type as used previously for the entered contact for the same occasion. If such a gift has not been previously given to the entered contact, the default will be the type of gift the user usually gives on such an occasion (derived by searching memory). If such a gift has not been given to anyone for the entered occasion, the default will be an appropriate gift of the average dollar amount that the user usually spends. The intelligent agent's choice of a default type of flower is made at times, and in part, by intelligent agents and expert systems incorporated in the intelligent agent learning modules. Other choices that the intelligent agent makes automatically or by default (such as but not limited to merchant, default message, "add on" products) are also made at times, and in part, by other intelligent agents or expert systems incorporated in other learning modules. In any event, the user may choose a different gift from the drop-down combo list (steps 648 and 650) (which may be filled by different items depending on the occasion or merchant chosen).

Figure 20:
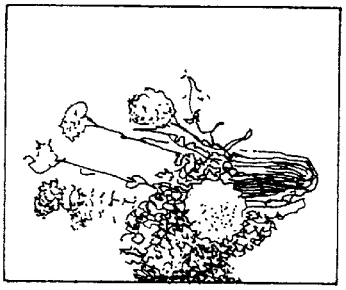
FIG. 20 is an illustration of a representative third screen on the representative menu of FIG. 17.

When the gift choice is made, or confirmed, a picture of the gift is displayed, along with its price. Shipping fees and tax, as well as the total bill, are calculated and displayed (step 652). See also FIG. 20.

The user is also offered "add on" items to choose from. As a user clicks on an item, the bill is automatically adjusted (steps 654 and 656).

The user can then cancel the order or approve or OK the order. If the user clicks OK (or tabs to that button and presses Enter), the order is entered in memory (step 658). The program also calculates what date the order must be shipped and enters that date also in memory. The calculated shipping date may depend on whether the delivery address is a home or work one (no weekend deliveries), whether the occasion occurs at a time of year with shipping constraints (e.g., Christmas in general, or Valentine's Day for flowers) or if other parameters exist. At this point in the program, the program may also ask the user if the current order is a one time order, or if the user wants the current order repeated every year.

If the user has previously sent anything to the contact (or entered the contact into a contact manager with shared files), and has a standard choice of anniversary bouquet, he or she need only enter name and occasion, tab through "Type of Flowers" and click OK. If a voice recognition module is incorporated in the intelligent agent, the user need only speak: "SEND flowers TO Jim Smith and his wife ON THEIR anniversary." (The prepositions act as delimiters for field entry.) In some variations, a synthesized voice repeats the entry along with the intelligent agent generated (and retrieved) data on date, address, message, and flower type. The synthesized voice then asks the user to confirm the order by saying "OK."

In some embodiments, clicking OK closes the ordering portion of the program (step 700). In other embodiments, the program enters a "dormant" phase like a memory resident desktop organizer, appointment scheduler or screen saver, waiting to "awake" when an new order is entered. In other embodiments, such as a stand-alone kiosk, clicking OK returns the program to an opening screen (step 700), inviting prospective users to log on (step 600).

Figure 21:
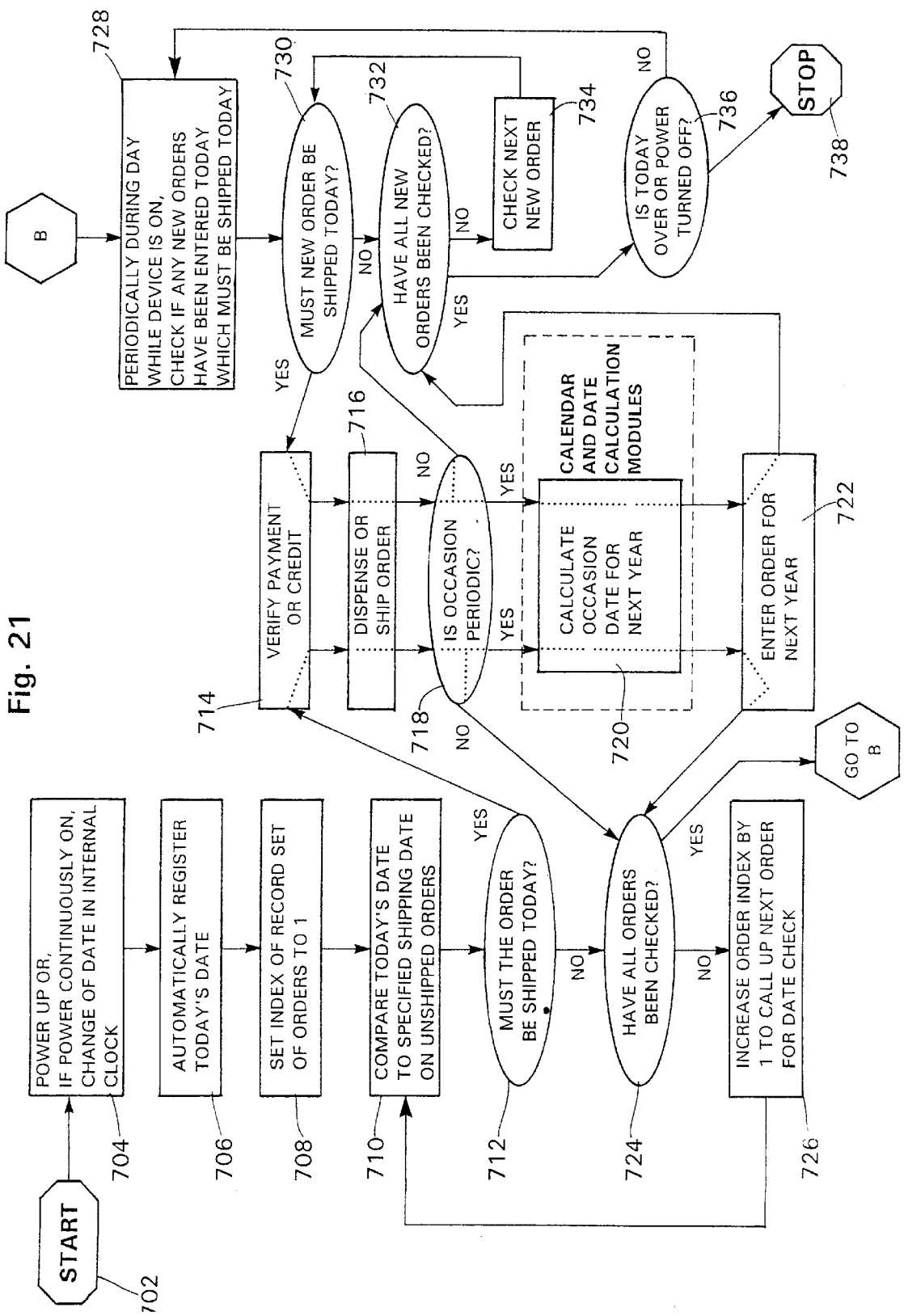
FIG. 21 is a flow diagram of a method for executing delegated tasks (including shipping or dispensing the ordered products and services) at the designated times.

An Illustration of Automated Order Shipping and Dispensing at a Future Time When Using the Intelligent Agent Referring to FIG. 21, the first thing done every day (steps 702 and 704), is that the central processing unit compares the current date on its internal clock with the list of dates on which orders must be shipped, processed or dispensed (steps 706, 708 and 710). The central processing unit retrieves the list of those to be dealt with on the current day and processes them (steps 710, 712, 714, 716, 718, 720, 722, 724 and 726). For each item the central processing unit checks to see if the order must be shipped on the current day (step 712) and verifies the payment procedure prior to dispensing or shipping (step 714) (prepaid funds available or verification of credit card number and account viability). The central processing unit then executes the order (step 716) whether by creating and dispensing the item for collection and shipping, by transmitting an order to a remote location for dispensing the item for collection and shipping, by transmitting an order to a third party supplier for shipping the item, or otherwise by dispensing and transmitting the item (be it physical or electronic) as described above.

The transmission of orders is accomplished via various output devices and means using analog and/or digital signals and modems to convert between analog and digital, where appropriate. Transmission occurs over wires (such as coaxial cable, telephone wires and fiber optic cables) of various private or public systems including telephone systems and cable TV system. Alternatively, transmission occurs using electromagnetic waves (such as but not limited to microwaves and radio waves) through various media (such as air) or no media (such as the vacuum of space) of various private or public systems including but not limited to cellular phones, direct satellite transmissions, interactive broadcast television. In addition, the transmission occurs within private or public networks, and/or networks of networks, including but not limited to intranets and the Internet. By way of example, in one embodiment, the transmission of orders is a fax transmission to a third party merchandise supplier over public telephone lines. In another embodiment, the transmission of orders is by direct wireless computer-to-computer data transmission over the cellular phone network. Various other methods of transmission have been described above.

If the initial data entry device is a desktop PC, terminal, or telephone (or other entry device intended to be used by one individual), the user is given a list of items to be shipped on the current day for confirmation. Alternatively, the items could be shipped with confirmation later sent to the user that the items had in fact been shipped as previously instructed.

After shipping or dispensing an order, the intelligent agent checks to see if the order is for a reoccurring occasion such as a birthday or holiday (step 718). If the occasion is reoccurring, then the occasion date for the next year is calculated (step 720) and the order is reentered for the following year (step 722). (In a stand-alone device, the order would not be reentered unless pre-paid or credit pre-authorized.)

As new entries are made during the day they are checked to ascertain if they must be shipped immediately (step 730) and if so, then processed (steps 714 and 716). Alternatively, the intelligent agent examines the database periodically, at scheduled times during the day, for new orders that must be shipped immediately (step 728). If it finds any such orders (step 730), it verifies the payment (step 714) (e.g., prepaid funds on account or valid pre-entered credit card number) as part of a first subtask. It then ships or dispenses the orders (step 716) as part of a second subtask. The intelligent agent checks to see if the orders are for a recurring occasion (step 718), and if so, calculates the next occurrence (step 720) and enters an appropriate order (step 722). It then continues the checking process (steps 732 and 734). As the intelligent agent is shut down each day, or the user otherwise logs off, and power is turned off, the program ends (steps 736 and 738). If instead, the intelligent agent remains on continuously, 24 hours a day, at the conclusion of each day (step 736), as it resets its internal time clock, it resets the program to the beginning (steps 702 and 704).

The intelligent agent described above builds and then accesses a database consisting of a number of data tables. The database can be constructed in a variety of ways, but an illustrative list of key tables includes: (a) a contacts table (or set of linked and related tables) that acts as a contact manager containing names, addresses, telephone numbers, and other personal and business information; (b) an occasion table (or set of linked and related tables) that contains general information on holidays, celebrations and other occasions, including means of calculating the date of occasions and holidays based on non-Gregorian calendars, and default holiday messages; (c) a products table (or set of linked and related tables) that contains the products or services which can be ordered and information concerning them including prices and bitmapped product images (or paths to such images) where appropriate, suppliers and the means to electronically send orders to them, and; (d) an orders table (or set of linked and related tables) that records items to be sent, where, to whom, functioning as the "do it" list for the program as well as history of past transactions. Other embodiments of the intelligent agent use tables appropriate to the tasks being delegated which may be similar or different from the above illustration.

From the foregoing description, it can be seen that the present invention comprises apparatus and methods for calculating occasion dates and converting dates between calendar systems, as well as intelligent agents which may use such apparatus and methods. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An apparatus for determining the date of periodic occasions, the apparatus comprising:
    (a) an occasion database for storing a plurality of occasions and a formula for each occasion for determining the date of each occasion for a given year; and
    (b) a processor for determining the date of occasions by using the formula.
2. An apparatus according to claim 1 further comprising:
    (c) a user interface including an occasion input device for entering an occasion, and an output device for communicating to a user the date of the occurrence of the occasion in a desired year as determined from the occasion database.
3. An apparatus according to claim 2 wherein the desired year is the year of the next occurrence of the occasion.
4. An apparatus according to claim 2 wherein the occasion database further includes information regarding at least some of the occasions, the information being retrieved for the entered occasion and communicated to the user by the output device along with the occasion date.
5. An apparatus according to claim 1 wherein the occasion database includes occasions and respective formulas associated with Gregorian and non-Gregorian calendars, the apparatus further comprising:
    (d) a date converter for storing data which allows for date conversions between Gregorian and non-Gregorian calendars, the date converter being used to obtain the occasion date in a desired calendar type from a specified occasion.
6. An apparatus according to claim 5 wherein the date converter is a table of Gregorian calendar dates for a predetermined number of years and corresponding calendar dates in at least one non-Gregorian calendar.
7. An apparatus according to claim 5 wherein the data converter includes:
    (i) a Gregorian reference date and a corresponding reference date for each of the non-Gregorian calendars; and
    (ii) a formula for each of the non-Gregorian calendars, the formula and the reference date being used by the processor for converting a Gregorian date to a corresponding date in the non-Gregorian calendar, or for converting a non-Gregorian date to a corresponding date in the Gregorian calendar.
8. An apparatus according to claim 1 further comprising:
    (c) a user interface including a time frame input device, and an output device for communicating to a user the occasions identified by the occasion database which occur within an inputted time frame.
9. An apparatus according to claim 8 wherein the time frame is a specified date, week or month.
10. An apparatus according to claim 1 wherein the occasion database includes occasions and respective formulas associated with Gregorian and non-Gregorian calendars.
11. An apparatus according to claim 1 further comprising:
    (c) a user interface having an occasion input device, the user interface including an occasion entry mode for allowing new occasions to be added to the occasion database by using the occasion input device to enter the new occasion and the formula for determining the date of the occasion for a given year.
12. An apparatus according to claim 1 wherein the occasion database includes occasions and respective formulas associated with Gregorian and non-Gregorian calendars, the apparatus further comprising:
    (c) a user interface including an occasion input device for entering an occasion associated with a non-Gregorian calendar, and an output device for communicating to a user the date of the occurrence of the occasion in a desired year in the Gregorian calendar and the non-Gregorian calendar associated with the occasion, as determined from the occasion database.
13. An apparatus for converting Gregorian dates to corresponding dates in at least two non-Gregorian calendar types, the apparatus comprising:
    (a) a date converter for storing data which allows for date conversions between a Gregorian calendar and at least two non-Gregorian calendars; and
    (b) a user interface connected to the date converter including an input device for entering a Gregorian date and at least two target non-Gregorian calendar types, and an output device for communicating to a user the corresponding dates in the targeted non-Gregorian calendar types.
14. An apparatus according to claim 13 wherein the date converter is a table of Gregorian calendar dates for a predetermined number of years and corresponding calendar dates in the at least two non-Gregorian calendar types.
15. An apparatus according to claim 13 wherein the data converter includes:
    (i) a Gregorian reference date and a corresponding reference date for each of the non-Gregorian calendars; and
    (ii) a formula for each of the non-Gregorian calendars, the formula and the reference date being used by the processor for converting an entered Gregorian date to a corresponding date in each of the non-Gregorian calendars.
16. An apparatus for converting a non-Gregorian date to a corresponding date in at least one other non-Gregorian calendar type, the apparatus comprising:
    (a) a date converter for storing data which allows for date conversions between at least two different non-Gregorian calendars; and
    (b) a user interface connected to the date converter including an input device for entering a non-Gregorian date and at least one different target non-Gregorian calendar type, and an output device for communicating to a user the corresponding date in the at least one targeted non-Gregorian calendar type.
17. An apparatus according to claim 16 wherein the date converter is a table of corresponding calendar dates for a predetermined number of years in the at least two different non-Gregorian calendar types.

18. An apparatus according to claim 16 wherein the data converter includes:
(i) a Gregorian reference date and a corresponding reference date for each of the non-Gregorian calendars; and
(ii) a formula for each of the non-Gregorian calendars, the formula and the reference date being used by the processor for converting an entered non-Gregorian date to a corresponding date in at least one other non-Gregorian calendar.

19. A method for determining the date of periodic occasions, the method using an occasion database and a processor, the method comprising:
(a) storing a plurality of occasions and a formula for each occasion for determining the date of each occasion for a given year; and
(b) using the processor and the formula to determine the date of occasions.

20. A method for converting Gregorian dates to corresponding dates in at least two non-Gregorian calendar types, the method using a date converter and a user interface connected to the date converter, the user interface including an input device and an output device, the method comprising:
(a) storing data in the date converter which allows for date conversions between a Gregorian calendar and at least two non-Gregorian calendars;
(b) entering a Gregorian date and at least two target non-Gregorian calendar types into the input device; and
(c) communicating to a user via the output device the corresponding dates in the targeted non-Gregorian calendar types.

21. A method for converting a non-Gregorian calendar date to a corresponding date in at least one other non-Gregorian calendar type, the method using a date converter and a user interface, the user interface including an input device and a an output device, the method comprising:
(a) storing data in the date converter which allows for date conversions between at least two different non-Gregorian calendars;
(b) entering a date of a non-Gregorian calendar and at least one different target non-Gregorian calendar type into the input device; and
(c) communicating to a user via the output device the corresponding date in the at least one targeted non-Gregorian calendar type.

22. An intelligent agent for executing tasks, at least some of the tasks being date sensitive, and at least some of the tasks being physical commercial transactions which require payment of funds for completion of the task, the intelligent agent comprising:
(a) at least one data input device for entering tasks to be executed, wherein at least one of the tasks include a first subtask for executing a physical commercial transaction at a first predetermined future time, and a second subtask for executing a payment of funds at a second predetermined future time, the payment of funds being related to the cost of the physical commercial transaction;
(b) at least one calendar and date calculation module for providing date information necessary to execute the date sensitive tasks;
(c) a computer connected to the at least one data input device and to the at least one calendar and date calculation module, the computer receiving the entered tasks and calendar and date information relevant to the tasks, processing the information, and generating instructions for executing the tasks; and
(d) at least one output device connected to the computer for execution of the tasks, the at least one output device including a first output device to perform the physical commercial transaction, and a second output device to execute the payment of funds.

23. An intelligent agent according to claim 22 wherein the first and second subtask are executed at the same time.

24. An intelligent agent for executing tasks, at least some of the tasks being date sensitive, the intelligent agent comprising:
(a) at least one data input device for entering tasks to be executed, wherein at least some of the date sensitive tasks are based upon a date of a non-Gregorian calendar;
(b) at least one calendar and date calculation module for providing date information necessary to execute the date sensitive tasks, the calendar and date calculation module being programmed to determine Gregorian calendar dates for executing the tasks based upon the non-Gregorian calendar or based at least in part on a non-Gregorian periodicity or periodicities;
(c) a computer connected to the at least one data input device and to the at least one calendar and date calculation module, the computer receiving the entered tasks and calendar and date information relevant to the tasks, processing the information, and generating instructions for executing the tasks, the instructions for executing the date sensitive tasks including instructions to execute at least one of the date sensitive tasks on a periodic basis; and
(d) at least one output device connected to the computer for execution of the tasks.

25. An intelligent agent for executing tasks, at least some of the tasks being date sensitive, the intelligent agent comprising:
(a) at least one data input device for entering tasks to be executed;
(b) at least one calendar and date calculation module for providing date information necessary to execute the date sensitive tasks;
(c) a computer connected to the at least one data input device and to the at least one calendar and date calculation module, the computer receiving the entered tasks and calendar and date information relevant to the tasks, processing the information, and generating instructions for executing the tasks, the instructions for executing the date sensitive tasks including instructions to execute at least one of the date sensitive tasks on a periodic basis, wherein the periodicities are non-conventional, and the calendar and date calculation module is programmed to determine selected non-conventional periodicities; and
(d) at least one output device connected to the computer for execution of the tasks.

26. A method of interconnecting a plurality of devices to form an intelligent agent for executing tasks, the devices including (i) at least one data input device, (ii) at least one calendar and date calculation module for providing date and information necessary to execute date sensitive tasks, the at least one calendar and date calculation module being programmed to determine Gregorian calendar dates for executing the tasks based upon the non-Gregorian calendar or based at least in part on a non-Gregorian periodicity or periodicities, (iii) a computer connected to the at least one data input device and to the at least one calendar and date calculation module, and (iv) at least one output device connected to the computer the method comprising the steps of:

(a) entering date sensitive tasks to be executed into the at least one data input device, wherein at least some of the date sensitive tasks are based upon a date of a non-Gregorian calendar;

(b) receiving the entered tasks and the calendar and date calculation module information relevant to the tasks by the computer;

(c) processing the information by the computer to generate instructions for executing the tasks including instructions to execute at least one of the date sensitive tasks on a periodic basis; and using the non-Gregorian calendar data when generating the task instructions, and (d) executing the tasks with the at least one output device.

27. A method of interconnecting a plurality of devices to form an intelligent agent for executing tasks, the devices including (i) at least one data input device, (ii) at least one calendar and date calculation module for providing date and information necessary to execute date sensitive tasks, (iii) a computer connected to the at least one data input device and to the at least one calendar and date calculation module, and (iv) at least one output device connected to the computer, the method comprising the steps of:

(a) entering date sensitive tasks to be executed into the at least one data input device;

(b) receiving the entered tasks and the calendar and date calculation module information relevant to the tasks by the computer;

(c) processing the information by the computer to generate instructions for executing the tasks, including instructions to execute at least one of the date sensitive tasks on a periodic basis; and (d) executing the tasks with the at least one output device, wherein the periodicities are non-conventional, and the calendar and date calculation module is programmed to determine selected non-conventional periodicities, step (a) including entering date sensitive tasks wherein the dates for executing the tasks have non-conventional periodicities.

28. A method of interconnecting a plurality of devices to form an intelligent agent for executing tasks, the devices including (i) at least one data input device, (ii) at least one calendar and date calculation module for providing date and information necessary to execute date sensitive tasks, (iii) a computer connected to the at least one data input device and to the at least one calendar and date calculation module, and (iv) at least one output device connected to the computer, the method comprising the steps of:

(a) entering date sensitive tasks to be executed into the at least one data input device, wherein at least one of the tasks includes a first subtask for executing a physical commercial transaction, and a second subtask for executing a payment of funds, the payment of funds being related to the cost of the physical commercial transaction;

(b) receiving the entered tasks and the calendar and date calculation module information relevant to the tasks by the computer;

(c) processing the information by the computer to generate instructions for executing the tasks; and (d) executing the tasks with the at least one output device by:

(i) using a first output device to perform the physical commercial transaction at a first predetermined future time, and (ii) using a second output device to execute the payment of funds at a second predetermined future time.

29. A method according to claim 28 wherein the first and second subtasks are executed at the same time.

\* \* \* \* \*